(12) United States Patent
Song et al.

(10) Patent No.: US 10,837,276 B2
(45) Date of Patent: Nov. 17, 2020

(54) METHOD AND SYSTEM FOR PERFORMING WIRELESS ULTRASONIC COMMUNICATIONS ALONG A DRILLING STRING

(71) Applicants: Limin Song, West Windsor, NJ (US); Yibing Zhang, Annandale, NJ (US); David A. Howell, Houston, TX (US); Scott W. Clawson, Califon, NJ (US)

(72) Inventors: Limin Song, West Windsor, NJ (US); Yibing Zhang, Annandale, NJ (US); David A. Howell, Houston, TX (US); Scott W. Clawson, Califon, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/139,421

(22) Filed: Sep. 24, 2018

(65) Prior Publication Data
US 2019/0112919 A1    Apr. 18, 2019

Related U.S. Application Data

(60) Provisional application No. 62/572,201, filed on Oct. 13, 2017.

(51) Int. Cl.
*E21B 47/16* (2006.01)
*E21B 47/017* (2012.01)
(Continued)

(52) U.S. Cl.
CPC .......... *E21B 47/16* (2013.01); *E21B 41/0085* (2013.01); *E21B 47/017* (2020.05);
(Continued)

(58) Field of Classification Search
None
See application file for complete search history.

(56) References Cited

U.S. PATENT DOCUMENTS

| | | | |
|---|---|---|---|
| 3,103,643 A | 9/1963 | Kalbfell | 340/17 |
| 3,205,477 A | 9/1965 | Kalbfell | 340/18 |

(Continued)

FOREIGN PATENT DOCUMENTS

| | | |
|---|---|---|
| CN | 102733799 | 6/2014 |
| EP | 0636763 | 2/1995 |

(Continued)

OTHER PUBLICATIONS

Arroyo, Javier et al. (2009) "Forecasting Histogram Time Series with K-Nearest Neighbours Methods," *International Journal of Forecasting*, v.25, pp. 192-207.

(Continued)

*Primary Examiner* — Curtis A Kuntz
*Assistant Examiner* — Jerold B Murphy
(74) *Attorney, Agent, or Firm* — ExxonMobil Upstream Research Company—Law Department

(57) ABSTRACT

A method and system are described for wirelessly communicating within a wellbore. The method includes constructing a communication network, which communicates during drilling operations along one or more drilling strings. The communication network is used to perform drilling operations for hydrocarbon operations, such as hydrocarbon exploration, hydrocarbon development, and/or hydrocarbon production.

37 Claims, 6 Drawing Sheets

(51) Int. Cl.
  *E21B 47/13* (2012.01)
  *E21B 41/00* (2006.01)
  *G01V 11/00* (2006.01)
  *H04W 72/04* (2009.01)

(52) U.S. Cl.
  CPC ............ *E21B 47/13* (2020.05); *G01V 11/002* (2013.01); *H04W 72/0453* (2013.01)

(56) References Cited

U.S. PATENT DOCUMENTS

| | | | | |
|---|---|---|---|---|
| 3,512,407 | A | 5/1970 | Zill | 73/152 |
| 3,637,010 | A | 1/1972 | Malay et al. | 166/51 |
| 3,741,301 | A | 6/1973 | Malay et al. | 166/191 |
| 3,781,783 | A | 12/1973 | Tucker | 340/18 |
| 3,790,930 | A | 2/1974 | Lamel et al. | 340/18 |
| 3,900,827 | A | 8/1975 | Lamel et al. | 340/18 |
| 3,906,434 | A | 9/1975 | Lamel et al. | 340/18 |
| 4,001,773 | A | 1/1977 | Lamel et al. | 340/18 |
| 4,072,871 | A * | 2/1978 | Wilson | B06B 1/0611 310/333 |
| 4,283,780 | A | 8/1981 | Nardi | 367/82 |
| 4,298,970 | A | 11/1981 | Shawhan et al. | 367/82 |
| 4,302,826 | A | 11/1981 | Kent et al. | 367/82 |
| 4,314,365 | A | 2/1982 | Petersen et al. | 367/82 |
| 4,884,071 | A | 11/1989 | Howard | 340/854 |
| 4,962,489 | A | 10/1990 | Medlin et al. | 367/32 |
| 5,128,901 | A | 7/1992 | Drumheller | 367/82 |
| 5,136,613 | A | 8/1992 | Dumestre, III | 375/1 |
| 5,166,908 | A * | 11/1992 | Montgomery | E21B 47/124 310/328 |
| 5,182,946 | A | 2/1993 | Boughner et al. | 73/151 |
| 5,234,055 | A | 8/1993 | Cornette | 166/278 |
| 5,283,768 | A | 2/1994 | Rorden | 367/83 |
| 5,373,481 | A | 12/1994 | Orban et al. | 367/82 |
| 5,468,025 | A | 11/1995 | Adinolfe et al. | 285/114 |
| 5,480,201 | A | 1/1996 | Mercer | 294/67.31 |
| 5,495,230 | A | 2/1996 | Lian | 340/551 |
| 5,562,240 | A | 10/1996 | Campbell | 227/130 |
| 5,592,438 | A | 1/1997 | Rorden et al. | 367/83 |
| 5,667,650 | A | 9/1997 | Face et al. | 204/298.07 |
| 5,850,369 | A | 12/1998 | Rorden et al. | 367/83 |
| 5,857,146 | A | 1/1999 | Kido | 455/38.3 |
| 5,924,499 | A * | 7/1999 | Birchak | E21B 47/14 175/40 |
| 5,960,883 | A | 10/1999 | Tubel et al. | 166/313 |
| 5,995,449 | A | 11/1999 | Green et al. | 367/83 |
| 6,049,508 | A | 4/2000 | Deflandre | 367/48 |
| 6,125,080 | A | 9/2000 | Sonnenschein et al. | 367/134 |
| 6,128,250 | A | 10/2000 | Reid et al. | 367/153 |
| 6,177,882 | B1 | 1/2001 | Ringgenberg et al. | 340/853.7 |
| 6,236,850 | B1 | 5/2001 | Desai | 455/343 |
| 6,239,690 | B1 | 5/2001 | Burbidge et al. | 340/10.33 |
| 6,300,743 | B1 | 10/2001 | Patino et al. | 320/106 |
| 6,320,820 | B1 | 11/2001 | Gardner et al. | 367/81 |
| 6,324,904 | B1 | 12/2001 | Ishikawa et al. | 73/152.03 |
| 6,360,769 | B1 | 3/2002 | Brisco | 137/268 |
| 6,394,184 | B2 | 5/2002 | Tolman et al. | 166/281 |
| 6,400,646 | B1 | 6/2002 | Shah et al. | 367/82 |
| 6,429,784 | B1 | 8/2002 | Beique et al. | 340/853.2 |
| 6,462,672 | B1 | 10/2002 | Besson | 340/853.2 |
| 6,543,538 | B2 | 4/2003 | Tolman et al. | 166/284 |
| 6,670,880 | B1 | 12/2003 | Hall et al. | 336/132 |
| 6,679,332 | B2 | 1/2004 | Vinegar et al. | 166/373 |
| 6,695,277 | B1 | 2/2004 | Gallis | 241/191 |
| 6,702,019 | B2 | 3/2004 | Dusterhoft et al. | 166/278 |
| 6,717,501 | B2 | 4/2004 | Hall et al. | 336/132 |
| 6,727,827 | B1 | 4/2004 | Edwards et al. | 340/854.9 |
| 6,745,012 | B1 | 6/2004 | Ton et al. | |
| 6,772,837 | B2 | 8/2004 | Dusterhoft et al. | 166/278 |
| 6,816,082 | B1 | 11/2004 | Laborde | 340/853.3 |
| 6,868,037 | B2 | 3/2005 | Dasgupta et al. | 367/54 |
| 6,880,634 | B2 | 4/2005 | Gardner et al. | 166/250.01 |
| 6,883,608 | B2 | 4/2005 | Parlar et al. | 166/278 |
| 6,899,178 | B2 | 5/2005 | Tubel | 166/313 |
| 6,909,667 | B2 | 6/2005 | Shah et al. | 367/83 |
| 6,912,177 | B2 | 6/2005 | Smith | 367/82 |
| 6,920,085 | B2 | 7/2005 | Finke et al. | 367/83 |
| 6,930,616 | B2 | 8/2005 | Tang et al. | 340/854.4 |
| 6,940,392 | B2 | 9/2005 | Chan et al. | 340/10.4 |
| 6,940,420 | B2 | 9/2005 | Jenkins | 340/855.6 |
| 6,953,094 | B2 | 10/2005 | Ross et al. | 166/381 |
| 6,956,791 | B2 | 10/2005 | Dopf et al. | 367/82 |
| 6,980,929 | B2 | 12/2005 | Aronstam et al. | 702/188 |
| 6,987,463 | B2 | 1/2006 | Beique et al. | 340/856.3 |
| 7,006,918 | B2 | 2/2006 | Economides et al. | 702/1 |
| 7,011,157 | B2 | 3/2006 | Costley et al. | 166/311 |
| 7,036,601 | B2 | 5/2006 | Berg et al. | 166/385 |
| 7,051,812 | B2 | 5/2006 | McKee et al. | 166/305.1 |
| 7,064,676 | B2 | 6/2006 | Hall et al. | 350/853.1 |
| 7,082,993 | B2 | 8/2006 | Ayoub et al. | 166/250.1 |
| 7,090,020 | B2 | 8/2006 | Hill et al. | 166/373 |
| 7,140,434 | B2 | 11/2006 | Chouzenoux et al. | 166/250.11 |
| 7,219,762 | B2 | 5/2007 | James et al. | 181/105 |
| 7,224,288 | B2 | 5/2007 | Hall et al. | 340/853.7 |
| 7,228,902 | B2 | 6/2007 | Oppelt | 166/250.02 |
| 7,249,636 | B2 | 7/2007 | Ohmer | 166/383 |
| 7,252,152 | B2 | 8/2007 | LoGiudice et al. | 166/386 |
| 7,257,050 | B2 | 8/2007 | Stewart et al. | 367/82 |
| 7,261,154 | B2 | 8/2007 | Hall et al. | 166/242.2 |
| 7,261,162 | B2 | 8/2007 | Deans et al. | 166/336 |
| 7,275,597 | B2 | 10/2007 | Hall et al. | 166/297 |
| 7,277,026 | B2 | 10/2007 | Hall et al. | 340/854.8 |
| RE40,032 | E | 1/2008 | van Borkhorst et al. | 455/343.2 |
| 7,317,990 | B2 | 1/2008 | Sinha et al. | 702/6 |
| 7,321,788 | B2 | 1/2008 | Addy et al. | 455/574 |
| 7,322,416 | B2 | 1/2008 | Burris, II et al. | 166/308.1 |
| 7,325,605 | B2 | 2/2008 | Fripp et al. | 166/250.01 |
| 7,339,494 | B2 | 3/2008 | Shah et al. | 340/855.7 |
| 7,348,893 | B2 | 3/2008 | Huang et al. | 340/854.3 |
| 7,385,523 | B2 | 6/2008 | Thomeer et al. | 340/854.8 |
| 7,387,165 | B2 | 6/2008 | Lopez de Cardenas et al. | 166/313 |
| 7,411,517 | B2 | 8/2008 | Flanagan | 340/854.4 |
| 7,477,160 | B2 | 1/2009 | Lemenager et al. | 340/853.1 |
| 7,516,792 | B2 | 4/2009 | Lonnes et al. | 166/308.1 |
| 7,551,057 | B2 | 6/2009 | King et al. | 340/5.72 |
| 7,590,029 | B2 | 9/2009 | Tingley | 367/82 |
| 7,595,737 | B2 | 9/2009 | Fink et al. | 340/854.4 |
| 7,602,668 | B2 | 10/2009 | Liang et al. | 367/25 |
| 7,649,473 | B2 | 1/2010 | Johnson et al. | 340/853.1 |
| 7,750,808 | B2 | 7/2010 | Masino et al. | 340/572.1 |
| 7,775,279 | B2 | 8/2010 | Marya et al. | 166/297 |
| 7,787,327 | B2 | 8/2010 | Tang et al. | 367/27 |
| 7,819,188 | B2 | 10/2010 | Auzerais et al. | 155/250 |
| 7,828,079 | B2 | 11/2010 | Oothoudt | 175/20 |
| 7,831,283 | B2 | 11/2010 | Ogushi et al. | 455/574 |
| 7,913,773 | B2 | 3/2011 | Li et al. | 175/40 |
| 7,952,487 | B2 | 5/2011 | Montebovi | 340/636.1 |
| 7,994,932 | B2 | 8/2011 | Huang et al. | 340/854.3 |
| 8,004,421 | B2 | 8/2011 | Clark | 340/854.4 |
| 8,044,821 | B2 | 10/2011 | Mehta | 340/855.7 |
| 8,049,506 | B2 | 11/2011 | Lazarev | 324/333 |
| 8,115,651 | B2 | 2/2012 | Camwell et al. | 340/853.2 |
| 8,117,907 | B2 | 2/2012 | Han et al. | 73/152.58 |
| 8,157,008 | B2 | 4/2012 | Lilley | 166/253.1 |
| 8,162,050 | B2 | 4/2012 | Roddy et al. | 166/253.1 |
| 8,220,542 | B2 | 7/2012 | Whitsitt et al. | 166/278 |
| 8,237,585 | B2 | 8/2012 | Zimmerman | 340/854.6 |
| 8,242,928 | B2 | 8/2012 | Prammer | 340/853.7 |
| 8,276,674 | B2 | 10/2012 | Lopez de Cardenas et al. | 166/373 |
| 8,284,075 | B2 | 10/2012 | Fincher et al. | 340/854.4 |
| 8,284,947 | B2 | 10/2012 | Giesbrecht et al. | 381/66 |
| 8,316,936 | B2 | 11/2012 | Roddy et al. | 166/253.1 |
| 8,330,617 | B2 | 12/2012 | Chen et al. | 340/854.6 |
| 8,347,982 | B2 | 1/2013 | Hannegan et al. | 175/5 |
| 8,358,220 | B2 | 1/2013 | Savage | 340/853.1 |
| 8,376,065 | B2 | 2/2013 | Teodorescu et al. | 175/40 |
| 8,381,822 | B2 | 2/2013 | Hales et al. | 166/377 |
| 8,388,899 | B2 | 3/2013 | Mitani et al. | 422/179 |
| 8,411,530 | B2 | 4/2013 | Slocum et al. | 367/90 |
| 8,434,354 | B2 | 5/2013 | Crow et al. | 73/152.04 |

(56) References Cited

U.S. PATENT DOCUMENTS

| | | | |
|---|---|---|---|
| 8,494,070 B2 | 7/2013 | Luo et al. .................... 375/262 |
| 8,496,055 B2 | 7/2013 | Mootoo et al. .............. 166/278 |
| 8,539,890 B2 | 9/2013 | Tripp et al. .................... 109/25 |
| 8,544,564 B2 | 10/2013 | Moore et al. .................. 175/50 |
| 8,552,597 B2 | 10/2013 | Song et al. ................... 307/149 |
| 8,556,302 B2 | 10/2013 | Dole ............................. 285/367 |
| 8,559,272 B2 | 10/2013 | Wang |
| 8,596,359 B2 | 12/2013 | Grigsby et al. ............. 166/278 |
| 8,605,548 B2 | 12/2013 | Froelich ........................ 367/82 |
| 8,607,864 B2 | 12/2013 | McLeod et al. .......... 166/250.1 |
| 8,664,958 B2 | 3/2014 | Simon .......................... 324/338 |
| 8,672,875 B2 | 3/2014 | Vanderveen et al. .......... 604/67 |
| 8,675,779 B2 | 3/2014 | Zeppetelle et al. .......... 375/340 |
| 8,683,859 B2 | 4/2014 | Godager .................... 73/152.54 |
| 8,689,621 B2 | 4/2014 | Godager .................... 73/152.54 |
| 8,701,480 B2 | 4/2014 | Eriksen ..................... 73/152.51 |
| 8,750,789 B2 | 6/2014 | Baldemair et al. ........... 455/11.1 |
| 8,787,840 B2 | 7/2014 | Srinivasan et al. ............. 455/69 |
| 8,805,632 B2 | 8/2014 | Coman et al. .................. 702/89 |
| 8,826,980 B2 | 9/2014 | Neer ........................... 166/255.1 |
| 8,833,469 B2 | 9/2014 | Purkis ......................... 166/373 |
| 8,893,784 B2 | 11/2014 | Abad ....................... E21B 43/26 |
| 8,910,716 B2 | 12/2014 | Newton et al. ............... 166/373 |
| 8,994,550 B2 | 3/2015 | Millot et al. ............ E21B 47/16 |
| 8,995,837 B2 | 3/2015 | Mizuguchi et al. ... H04B 10/27 |
| 9,062,508 B2 | 6/2015 | Huval et al. ........... E21B 47/122 |
| 9,062,531 B2 | 6/2015 | Jones .................... E21B 47/082 |
| 9,075,155 B2 | 7/2015 | Luscombe et al. ..... G01V 1/226 |
| 9,078,055 B2 | 7/2015 | Nguyen et al. .......... H04R 5/00 |
| 9,091,153 B2 | 7/2015 | Yang et al. .............. E21B 47/12 |
| 9,133,705 B2 | 9/2015 | Angeles Boza ........ E21B 47/12 |
| 9,140,097 B2 | 9/2015 | Themig et al. .......... E21B 34/12 |
| 9,144,894 B2 | 9/2015 | Barnett et al. ........... B25B 17/00 |
| 9,206,645 B2 | 12/2015 | Hallundbaek ............. E21B 7/04 |
| 9,279,301 B2 | 3/2016 | Lovorn et al. ........ E21B 21/103 |
| 9,284,819 B2 | 3/2016 | Tolman et al. ........... E21B 41/00 |
| 9,284,834 B2 | 3/2016 | Alteirac et al. ........... E21B 47/12 |
| 9,310,510 B2 | 4/2016 | Godager .................. G01V 3/38 |
| 9,333,350 B2 | 5/2016 | Rise et al. ......... A61N 1/36082 |
| 9,334,696 B2 | 5/2016 | Hay ....................... E21B 47/12 |
| 9,359,841 B2 | 6/2016 | Hall ........................ E21B 23/00 |
| 9,363,605 B2 | 6/2016 | Goodman et al. ..... H04R 17/00 |
| 9,376,908 B2 | 6/2016 | Ludwig et al. ......... E21B 47/01 |
| 9,441,470 B2 | 9/2016 | Guerrero et al. ....... E21B 43/14 |
| 9,515,748 B2 | 12/2016 | Jeong et al. ............ G10L 25/90 |
| 9,557,434 B2 | 1/2017 | Keller et al. ............. G01V 1/52 |
| 9,617,829 B2 | 4/2017 | Dale et al. ............. E21B 41/00 |
| 9,617,850 B2 | 4/2017 | Fripp et al. ............. E21B 47/18 |
| 9,631,485 B2 | 4/2017 | Keller et al. ........... E21B 47/16 |
| 9,657,564 B2 | 5/2017 | Stolpman ................ E21B 47/16 |
| 9,664,037 B2 | 5/2017 | Logan et al. ......... E21B 47/122 |
| 9,670,773 B2 | 6/2017 | Croux ..................... E21B 47/16 |
| 9,683,434 B2 | 6/2017 | Machocki ............... E21B 44/00 |
| 9,686,021 B2 | 6/2017 | Merino .................. E21B 47/16 |
| 9,715,031 B2 | 7/2017 | Contant et al. ....... E21B 47/122 |
| 9,721,448 B2 | 8/2017 | Wu et al. ............... G08B 21/20 |
| 9,759,062 B2 | 9/2017 | Deffenbaugh et al. ..................... E21B 47/16 |
| 9,816,373 B2 | 11/2017 | Howell et al. .......... E21B 47/16 |
| 9,822,634 B2 | 11/2017 | Gao ....................... E21B 47/16 |
| 9,863,222 B2 | 1/2018 | Morrow et al. ....... E21B 43/122 |
| 9,879,525 B2 | 1/2018 | Morrow et al. ....... E21B 47/12 |
| 9,945,204 B2 | 4/2018 | Ross et al. ............ E21B 33/127 |
| 9,963,955 B2 | 5/2018 | Tolman et al. ........ E21B 43/119 |
| 10,100,635 B2 | 10/2018 | Keller et al. ........... E21B 47/18 |
| 10,103,846 B2 | 10/2018 | van Zelm et al. ...... E21B 47/12 |
| 10,132,149 B2 | 11/2018 | Morrow et al. ....... E21B 43/267 |
| 10,145,228 B2 | 12/2018 | Yarus et al. ........... E21B 44/00 |
| 10,167,716 B2 | 1/2019 | Clawson et al. ....... E21B 47/14 |
| 10,167,717 B2 | 1/2019 | Deffenbaugh et al. ..................... E21B 47/16 |
| 10,190,410 B2 | 1/2019 | Clawson et al. ....... E21B 47/14 |
| 10,196,862 B2 | 2/2019 | Li-Leger et al. ....... E21B 17/02 |
| 2002/0180613 A1 | 12/2002 | Shi et al. ............... E21B 47/18 47/18 |
| 2002/0196743 A1 | 12/2002 | Thalanany et al. |
| 2003/0056953 A1 | 3/2003 | Tumlin et al. ............... 166/298 |
| 2003/0067940 A1 | 4/2003 | Edholm |
| 2003/0117896 A1 | 6/2003 | Sakuma et al. ................. 367/81 |
| 2004/0020063 A1 | 2/2004 | Lewis et al. ................... 33/313 |
| 2004/0200613 A1 | 10/2004 | Fripp et al. .............. 166/250.01 |
| 2004/0239521 A1 | 12/2004 | Zierolf ....................... 340/854.1 |
| 2005/0269083 A1 | 12/2005 | Burris et al. .............. 166/255.2 |
| 2005/0284659 A1 | 12/2005 | Hall et al. ....................... 175/27 |
| 2006/0001549 A1* | 1/2006 | Shah ..................... G01V 11/002 340/854.4 |
| 2006/0033638 A1 | 2/2006 | Hall et al. ................... 340/854.6 |
| 2006/0041795 A1 | 2/2006 | Gabelmann et al. ......... 714/699 |
| 2006/0090893 A1 | 5/2006 | Sheffield .................. 166/250.15 |
| 2006/0114746 A1* | 6/2006 | Gardner .................. E21B 47/16 367/82 |
| 2006/0187755 A1 | 8/2006 | Tingley |
| 2007/0139217 A1 | 6/2007 | Beique et al. ............. 340/856.3 |
| 2007/0146351 A1 | 6/2007 | Katsurahira et al. ......... 345/179 |
| 2007/0156359 A1 | 7/2007 | Varsamis et al. .............. 702/69 |
| 2007/0219758 A1 | 9/2007 | Bloomfield .................. 702/190 |
| 2007/0254604 A1 | 11/2007 | Kim ............................... 455/88 |
| 2007/0272411 A1 | 11/2007 | Lopez de Cardenas et al. ........... 166/305.1 |
| 2008/0030365 A1 | 2/2008 | Fripp et al. ............. E21B 47/16 |
| 2008/0110644 A1 | 5/2008 | Howell et al. ............... 166/387 |
| 2008/0185144 A1 | 8/2008 | Lovell ..................... 166/250.17 |
| 2008/0247273 A1* | 10/2008 | Chemali ............... E21B 17/028 367/82 |
| 2008/0304360 A1 | 12/2008 | Mozer ......................... 367/117 |
| 2009/0003133 A1 | 1/2009 | Dalton et al. .................. 367/82 |
| 2009/0030614 A1 | 1/2009 | Carnegie et al. ................ 702/6 |
| 2009/0034368 A1 | 2/2009 | Johnson ......................... 367/83 |
| 2009/0045974 A1 | 2/2009 | Patel ......................... 340/854.6 |
| 2009/0080291 A1 | 3/2009 | Tubel et al. .................... 367/81 |
| 2009/0166031 A1 | 7/2009 | Hernandez ............... 166/250.01 |
| 2010/0013663 A1 | 1/2010 | Cavender et al. ......... 340/854.3 |
| 2010/0089141 A1 | 4/2010 | Rioufol et al. ............ 73/152.28 |
| 2010/0112631 A1 | 5/2010 | Hur et al. ........................ 435/39 |
| 2010/0133004 A1 | 6/2010 | Burleson et al. ................ 175/2 |
| 2010/0182161 A1 | 7/2010 | Robbins et al. ........... 340/853.7 |
| 2010/0212891 A1 | 8/2010 | Stewart et al. .......... 166/250.12 |
| 2011/0061862 A1 | 3/2011 | Loretz et al. ............ 166/250.11 |
| 2011/0066378 A1 | 3/2011 | Lerche et al. .................... 702/6 |
| 2011/0168403 A1 | 7/2011 | Patel ............................ 166/373 |
| 2011/0188345 A1 | 8/2011 | Wang ............................. 367/34 |
| 2011/0297376 A1 | 12/2011 | Holderman et al. .......... 166/278 |
| 2011/0297673 A1 | 12/2011 | Zbat et al. ..................... 219/756 |
| 2011/0301439 A1 | 12/2011 | Albert et al. .................. 600/301 |
| 2011/0315377 A1 | 12/2011 | Rioufol .................... 166/250.17 |
| 2012/0043079 A1 | 2/2012 | Wassouf et al. ............... 166/250 |
| 2012/0126992 A1 | 5/2012 | Rodney et al. ................ 340/850 |
| 2012/0152562 A1 | 6/2012 | Newton et al. ................ 166/369 |
| 2012/0179377 A1 | 7/2012 | Lie ................................... 702/6 |
| 2012/0250461 A1* | 10/2012 | Millot ................... E21B 47/16 367/82 |
| 2013/0000981 A1 | 1/2013 | Grimmer et al. ............... 175/45 |
| 2013/0003503 A1 | 1/2013 | L'Her et al. ................... 367/106 |
| 2013/0106615 A1 | 5/2013 | Prammer .................. 340/854.6 |
| 2013/0138254 A1 | 5/2013 | Seals et al. .................... 700/282 |
| 2013/0192823 A1 | 8/2013 | Barrilleaux et al. ..... 166/250.01 |
| 2013/0278432 A1 | 10/2013 | Shashoua et al. .......... 340/853.7 |
| 2013/0319102 A1 | 12/2013 | Ringgenberg et al. .... 73/152.28 |
| 2014/0060840 A1 | 3/2014 | Hartshorne et al. .......... 166/300 |
| 2014/0062715 A1 | 3/2014 | Clark ........................ 340/853.2 |
| 2014/0102708 A1 | 4/2014 | Purkis et al. ............... 166/308.1 |
| 2014/0133276 A1 | 5/2014 | Volker et al. .................... 367/82 |
| 2014/0152659 A1 | 6/2014 | Davidson et al. ............ 345/420 |
| 2014/0153368 A1 | 6/2014 | Bar-Cohen et al. ............. 367/81 |
| 2014/0166266 A1 | 6/2014 | Read ........................ 166/250.01 |
| 2014/0170025 A1 | 6/2014 | Weiner et al. ............... 422/82.01 |
| 2014/0266769 A1 | 9/2014 | van Zelm ................... 340/854.3 |
| 2014/0327552 A1 | 11/2014 | Filas et al. ................... 340/854.6 |
| 2014/0352955 A1 | 12/2014 | Tubel et al. .............. 166/250.15 |
| 2015/0003202 A1 | 1/2015 | Palmer et al. .................. 367/82 |
| 2015/0009040 A1 | 1/2015 | Bowles et al. ............. 340/854.6 |
| 2015/0027687 A1 | 1/2015 | Tubel ............................. 166/72 |
| 2015/0041124 A1 | 2/2015 | Rodriguez .................. 166/255.1 |
| 2015/0041137 A1 | 2/2015 | Rodriguez .................... 166/301 |

(56) References Cited

U.S. PATENT DOCUMENTS

| | | | |
|---|---|---|---|
| 2015/0152727 A1 | 6/2015 | Fripp et al. | E21B 47/14 |
| 2015/0159481 A1 | 6/2015 | Mebarkia et al. | E21B 47/065 |
| 2015/0167425 A1 | 6/2015 | Hammer et al. | E21B 34/06 |
| 2015/0176370 A1 | 6/2015 | Greening et al. | E21B 41/00 |
| 2015/0275657 A1* | 10/2015 | Deffenbaugh | E21B 47/14 340/854.4 |
| 2015/0292319 A1 | 10/2015 | Disko et al. | E21B 47/16 |
| 2015/0292320 A1 | 10/2015 | Lynk et al. | E21B 47/16 |
| 2015/0300159 A1 | 10/2015 | Stiles et al. | E21B 47/16 |
| 2015/0330200 A1 | 11/2015 | Richard et al. | E21B 44/00 |
| 2015/0337642 A1 | 11/2015 | Spacek | E21B 44/005 |
| 2015/0354351 A1 | 12/2015 | Morrow et al. | E21B 47/16 |
| 2015/0377016 A1 | 12/2015 | Ahmad | E21B 47/122 |
| 2016/0010446 A1 | 1/2016 | Logan et al. | E21B 47/122 |
| 2016/0047230 A1 | 2/2016 | Livescu et al. | E21B 47/10 |
| 2016/0047233 A1 | 2/2016 | Butner et al. | E21B 47/12 |
| 2016/0076363 A1 | 3/2016 | Morrow et al. | E21B 147/12 |
| 2016/0109606 A1 | 4/2016 | Market et al. | G01V 1/50 |
| 2016/0215612 A1 | 7/2016 | Morrow | E21B 47/122 |
| 2017/0138185 A1 | 5/2017 | Saed et al. | E21B 47/16 |
| 2017/0145811 A1 | 5/2017 | Robison et al. | E21B 47/0007 |
| 2017/0152741 A1 | 6/2017 | Park et al. | E21B 47/123 |
| 2017/0167249 A1 | 6/2017 | Lee et al. | E21B 47/14 |
| 2017/0204719 A1 | 7/2017 | Babakhani | E21B 47/0005 |
| 2017/0254183 A1 | 9/2017 | Vasques et al. | E21B 47/16 |
| 2017/0293044 A1 | 10/2017 | Gilstrap et al. | G01V 1/50 |
| 2017/0314386 A1 | 11/2017 | Orban et al. | E21B 47/091 |
| 2017/0317810 A1* | 11/2017 | Gore | E21B 47/122 |
| 2018/0010449 A1 | 1/2018 | Roberson et al. | E21B 47/16 |
| 2018/0058191 A1 | 3/2018 | Romer et al. | E21B 47/0007 |
| 2018/0058198 A1 | 3/2018 | Ertas et al. | E21B 47/12 |
| 2018/0058202 A1 | 3/2018 | Disko et al. | E21B 47/14 |
| 2018/0058203 A1 | 3/2018 | Clawson et al. | E21B 47/14 |
| 2018/0058204 A1 | 3/2018 | Clawson et al. | E21B 47/14 |
| 2018/0058205 A1 | 3/2018 | Clawson et al. | E21B 47/14 |
| 2018/0058206 A1 | 3/2018 | Zhang et al. | E21B 47/16 |
| 2018/0058207 A1 | 3/2018 | Song et al. | E21B 47/16 |
| 2018/0058208 A1 | 3/2018 | Song et al. | E21B 47/16 |
| 2018/0058209 A1 | 3/2018 | Song et al. | E21B 47/16 |
| 2018/0066490 A1 | 3/2018 | Kjos | E21B 33/035 |
| 2018/0066510 A1 | 3/2018 | Walker et al. | E21B 47/011 |
| 2019/0112915 A1 | 4/2019 | Disko et al. | E21B 47/14 |
| 2019/0112916 A1 | 4/2019 | Song et al. | E21B 47/14 |
| 2019/0112917 A1 | 4/2019 | Disko et al. | E21B 47/14 |
| 2019/0112918 A1 | 4/2019 | Yi et al. | E21B 4/16 |
| 2019/0112919 A1 | 4/2019 | Song et al. | E21B 47/16 |
| 2019/0116085 A1 | 4/2019 | Zhang et al. | H04L 12/24 |
| 2019/0154859 A1 | 5/2019 | Song et al. | |

FOREIGN PATENT DOCUMENTS

| | | |
|---|---|---|
| EP | 1409839 | 4/2005 |
| EP | 2677698 | 12/2013 |
| EP | 2763335 | 8/2014 |
| WO | WO2001/03391 | 1/2001 |
| WO | WO2002/027139 | 4/2002 |
| WO | WO2004/033852 | 4/2004 |
| WO | WO2010/074766 | 7/2010 |
| WO | WO2013/079928 | 6/2013 |
| WO | WO2013/162506 | 10/2013 |
| WO | WO2014/018010 | 1/2014 |
| WO | WO2014/049360 | 4/2014 |
| WO | WO2014/100271 | 6/2014 |
| WO | WO2014/134741 | 9/2014 |
| WO | WO2015/117060 | 8/2015 |

OTHER PUBLICATIONS

Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.

Arroyo, Javier et al. (2011) "Forecasting with Interval and Histogram Data Some Financial Applications," *Univ. of California, Dept. of Economics*, 46 pages.

Emerson Process Management (2011), "Roxar downhole Wireless PT sensor system," www.roxar.com, or downhole@roxar.com, 2 pgs.

Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.

Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.

Qu, X. et al. (2011) "Reconstruction fo Self-Sparse 20 NMR Spectra From undersampled Data in the Indirect Dimension", pp. 8888-8909.

U.S. Department of Defense (1999) "Interoperability and Performance Standards for Medium and High Frequency Radio Systems," *MIL-STD-188-141B*, Mar. 1, 1999, 584 pages.

U.S. Appl. No. 15/666,334, filed Aug. 1, 2017, Walker, Katie M. et al.

U.S. Appl. No. 62/782,153, filed Dec. 19, 2019, Yi, Xiaohua et al.

U.S. Appl. No. 62/782,160, filed Dec. 19, 2018, Hall, Timothy J. et al.

\* cited by examiner

METHOD AND SYSTEM FOR PERFORMING WIRELESS ULTRASONIC COMMUNICATIONS ALONG A DRILLING STRING

CROSS REFERENCE TO RELATED APPLICATION

This application claims the priority benefit of U.S. Provisional Application No. 62/572,201 filed Oct. 13, 2017 entitled "Method and System for Performing Wireless Ultrasonic Communications along a Drilling String," the entirety of which is incorporated herein.

This application is related to the following U.S. patents and patent applications, the disclosures of which are incorporated herein by reference in their entireties: U.S. Pat. No. 10,415,376 titled "Dual Transducer Communications Node For Downhole Acoustic Wireless Networks and Method Employing Same," U.S. patent application Ser. No. 15/665,931, filed Aug. 1, 2017, titled "Communication Networks, Relay Nodes for Communication Networks, and Methods of Transmitting Data Among a Plurality of Relay Nodes,"U.S. Pat. No. 10,487,647 titled "Hybrid Downhole Acoustic Wireless Network," U.S. Pat. No. 10,167,716 titled "Methods of Acoustically Communicating And Wells That Utilize The Methods," U.S. Pat. No. 10,364,669 titled "Methods of Acoustically Communicating And Wells That Utilize The Methods," U.S. Pat. No. 10,190,410 titled "Methods of Acoustically Communicating and Wells that Utilize the Methods," U.S. Pat. No. 10,526,888 titled "Downhole Multiphase Flow Sensing Methods," U.S. Pat. No. 10,344,583 titled "Acoustic Housing for Tubulars".

This application is related to the following U.S. Patent Applications having common inventors and assignee and filed on an even date herewith, the disclosures of which are incorporated by reference herein in their entireties: U.S. patent application Ser. No. 16/139,414 titled "Method and System For Performing Operations Using Communications"; U.S. patent application No. 16/139/394 "Method And System For Performing Communications Using Aliasing"; U.S. patent application Ser. No. 16/139,427 titled "Method and System For Performing Operations With Communications"; U.S. patent application Ser. No. 16/139/384 titled "Method and System for Performing Hydrocarbon Operations With Mixed Communication Networks"; and U.S. Pat. No. 10,697,288 titled "Dual Transducer Communications Node Including Piezo Pre-Tensioning for Acoustic Wireless Networks and Method Employing Same."

FIELD OF THE INVENTION

This disclosure relates generally to the field of acoustically communicating with communication nodes along tubular members. Specifically, the disclosure relates to methods and systems for acoustically communicating with communication nodes disposed along one or more drilling string within a wellbore to enhance efficient drilling operations.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

The exchange of information may be used to manage the hydrocarbon operations. By way of example, several real-time data systems or methods have been proposed in hydrocarbon exploration, hydrocarbon development, and/or hydrocarbon production operations. To exchange information, the devices may communicate with physical connections or wireless connections. As a first example, a physical connection, such as a cable, an electrical conductor or a fiber optic cable, is secured to a tubular member, which may be used to evaluate subsurface conditions. The cable may be secured to an inner portion of the conduit and/or an outer portion of the conduit. The cable provides a hard wire connection to provide real-time transmission of data. Further, the cables may be used to provide high data transmission rates and the delivery of electrical power directly to downhole devices, such as sensors. However, the use of physical cables may be difficult as the cables have to be unspooled and attached to the conduit sections disposed within a wellbore. As a result, the cables may be damaged by other operations within the wellbore and/or may be damaged during installation of the tubular members (e.g., in installations that involve rotating the tubular members). Further, passages have to be provided in certain downhole equipment to provide a physical path for the cables. These passages introduce additional potential failure points, and may have to be provided in equipment not even associated with the communication network, which may increase costs for hydrocarbon operations.

As an alternative to physical connection or hard-wired configurations, wireless connections or technologies may be used for downhole communications. Such technologies are referred to as wireless telemetry. A wireless network may include various communication nodes that exchange information with each other to manage data communication within the wellbore. In addition, a computer system may also be in communication with the wireless network to manage the hydrocarbon operations from a surface location. To operate, the communication nodes may involve different wireless network types. As a first example, radio transmissions may be used for wellbore communications. However, the use of radio transmissions may be impractical or unavailable in certain environments or during certain operations, such as drilling operations. Other systems may use an acoustic wireless network to transmit an acoustic signal, such as a vibration, via a tone transmission medium. In general, a given tone transmission medium may only permit communication within a certain frequency range; and, in some systems, this frequency range may be relatively small. Such systems may be referred to herein as spectrum-constrained systems. An example of a spectrum-constrained system is a well, such as a hydrocarbon well, that includes a plurality of communication nodes spaced-apart along a length of tubular members thereof.

While the downhole wireless network may be beneficial, conventional data transmission mechanisms may not be effective and may be problematic to operate. Indeed, the downhole environment may include conditions within the wellbore that are unknown and unpredictable. These conditions are more complicated when drilling operations are being performed within the wellbore, which may result in varying fluid compositions (e.g., gas, water and oil) and/or varying mechanical noises within the wellbore (e.g., noise caused by rotating machine, drilling string vibration, fluid flow, rock cutting and the like). Conventional approaches may involve mud-pulse communication approaches, electromagnetic communication approaches, and low-frequency acoustics communication approaches. However, these approaches typically have to cease drilling operations to communicate data to the surface, involve low data rates and involve long latency periods for communications. As a result, conventional communication methods are problematic and have certain deficiencies.

Accordingly, there remains a need in the industry for methods and systems that are more efficient and may lessen problems associated with noisy and ineffective communication. Further, a need remains for efficient approaches to perform acoustic communications along drilling strings, which may manage the transmitted signals to enhance the communication within the wellbore during drilling operations. The present techniques provide methods and systems that overcome one or more of the deficiencies discussed above.

SUMMARY

In one embodiment, a method of communicating data among a plurality of communication nodes along one or more drilling strings is described. The method comprising: creating a communication network, wherein the communication network comprises a plurality of communication nodes, wherein each of the plurality of communication nodes are configured to transmit signals between two or more of the plurality of communication nodes along one or more drilling strings while concurrently performing drilling operations; disposing the plurality of communication nodes along the one or more drilling strings; communicating operational data between two or more of the plurality of communication nodes during drilling operations; and performing drilling operations based on the operational data.

In other embodiments, the method may include various enhancements. The method may include wherein each of the plurality of communication nodes are configured to transmit signals between two or more of the plurality of communication nodes along one or more drilling strings in an omnidirectional mode or a directional mode, and wherein the transmission of the operational data is performed in a directional mode or in an omnidirectional mode; wherein each of the plurality of communication nodes comprise one or more transducers; wherein each of the plurality of communication nodes comprise a first ring of transducers and a second ring of transducers; wherein each of the transducers is disposed within a separate housing and communicates with a primary communication node controller to manage the transmission of signals; wherein each of the plurality of communication nodes is configured as a collar that is disposed around one of the one or more drilling strings and comprise transducers; wherein the transducers are circumferentially spaced apart about a perimeter of one of the one or more drilling strings; wherein the transducers are equidistantly spaced apart about a perimeter of one of the one or more drilling strings; wherein each of the plurality of communication nodes in the directional mode transmit a signal with the first ring of transducers and dampens the transmitted signal with the second ring of transducers; wherein each of the plurality of communication nodes generates dominantly symmetric shear wave mode (T0); wherein each of the plurality of communication nodes generates dominantly torsional wave mode or longitudinal wave mode; wherein the communicating operational data between the two or more of the plurality of communication nodes comprises: receiving one or more signals in one of the plurality of communication nodes, and filtering the one or more signals using a high pass filter to lessen background noise from the one or more signals in the one of the plurality of communication nodes; further comprising: i) monitoring the communication network for an event, ii) modifying one or more of the plurality of communication nodes to the directional mode if an event is detected, and iii) continuing communicating between the two or more of the plurality of communication nodes if an event is not detected, and iv) repeating steps i) to iii) until the hydrocarbon operations are complete; further comprising disposing the plurality of communication nodes and the one or more drilling strings within a wellbore; wherein communicating operational data between two or more of the plurality of communication nodes during drilling operations further comprises transmitting the operational data through a portion of the drilling string between two or more of the plurality of communication nodes; wherein communicating operational data between two or more of the plurality of communication nodes during drilling operations further comprises transmitting the operational data through a portion of the fluid adjacent to the drilling string between two or more of the plurality of communication nodes; further comprising monitoring wear on the drill bit, and wherein the communicating operational data between two or more of the plurality of communication nodes during drilling operations further comprises transmitting the monitored wear data to a control unit; further comprising monitoring position of the drill bit, and wherein the communicating operational data between two or more of the plurality of communication nodes during drilling operations further comprises transmitting the monitored position data to a control unit; further comprising monitoring temperature near the drill bit, and wherein the communicating operational data between two or more of the plurality of communication nodes during drilling operations further comprises transmitting the monitored temperature data to a control unit; further comprising monitoring vibration near the drill bit, and wherein the communicating operational data between two or more of the plurality of communication nodes during drilling operations further comprises transmitting the monitored vibrational data to a control unit and/or wherein the communicating operational data between two or more of the plurality of communication nodes during drilling operations comprises communicating at frequencies greater than 50 kilo hertz or at frequencies greater than 200 kilo hertz.

A system for communicating along one or more drilling strings is described. The system comprising: one or more drilling strings; a bottomhole assembly coupled to the drilling string; and a communication network coupled to the one or more drilling strings, wherein the communication network comprises a plurality of communication nodes, wherein each of the plurality of communication nodes are configured to communicate operational data between two or more of the plurality of communication nodes during drilling operations.

In other embodiments, the system may include various enhancements. The system may include wherein the each of the plurality of communication nodes are configured to transmit the operational data in a omnidirectional mode or a directional mode based on a transmission setting; wherein each of the plurality of communication nodes comprise a first ring of transducers and a second ring of transducers; wherein each of the transducers is disposed within a separate housing and communicates with a primary communication node controller to manage the transmission of signals; wherein each of the plurality of communication nodes is configured as a collar that is disposed around one of the one or more drilling strings and comprise transducers; wherein the transducers are circumferentially spaced apart about a perimeter of one of the one or more drilling strings; wherein the transducers are equidistantly spaced apart about a perimeter of one of the one or more drilling strings; wherein each of the plurality of communication nodes in the directional mode transmit a signal with the first ring of transducers and dampens the transmitted signal with the second ring of transducers; wherein each of the plurality of communication nodes generates dominantly symmetric shear wave mode (T0); wherein each of the plurality of communication nodes generates dominantly torsional wave mode or longitudinal wave mode; wherein each of the plurality of communication nodes is configured to: receive one or more signals, and determine whether the one or more signals indicate that the communication node enter the directional mode; wherein each of the plurality of communication nodes are further configured to: receive one or more signals, and filter the one or more signals using a high pass filter to lessen background noise from the one or more signals; wherein each of the plurality of communication nodes are further configured to: i) monitor the communication network for an event, ii) modify one or more of the plurality of communication nodes to the directional mode if an event is detected, iii) continue communicating with the two or more of the plurality of communication nodes if an event is not detected, and iv) repeat steps i) to iii) until the hydrocarbon operations are complete; wherein the plurality of communication nodes and the one or more drilling strings are disposed within the wellbore; wherein the plurality of communication nodes and the one or more tubular members are disposed along the drilling string; wherein each of the plurality of communication nodes are configured to transmit the operational data through a portion of the drilling string between two or more of the plurality of communication nodes; wherein each of the plurality of communication nodes are configured to transmit the operational data through a portion of the fluid adjacent to the drilling string between two or more of the plurality of communication nodes; wherein one or more of the plurality of communication nodes are configured to: monitor wear on the drill bit, and transmit the monitored wear data to a control unit; wherein one or more of the plurality of communication nodes are configured to: monitor position of the drill bit, and transmit the monitored position data to a control unit; wherein one or more of the plurality of communication nodes are configured to: monitor temperature near the drill bit, and transmit the monitored temperature data to a control unit; wherein one or more of the plurality of communication nodes are configured to: monitor vibration near the drill bit, and transmit the monitored vibration data to a control unit; and/or wherein one or more of the plurality of communication nodes are configured to: communicate at frequencies greater than 50 kilo hertz or at frequencies greater than 200 kilo hertz.

In yet another embodiment, a method of communicating data among a plurality of communication nodes along one or more tubular members is described. The method comprising: creating a communication network, wherein the communication network comprises a plurality of communication nodes, wherein each of the plurality of communication nodes are configured to transmit signals between two or more of the plurality of communication nodes along one or more tubular members in an omnidirectional mode or a directional mode; disposing the plurality of communication nodes along the one or more drilling strings; communicating operational data between two or more of the plurality of communication nodes, wherein the transmission of the operational data is performed in a directional mode or in an omnidirectional mode; and performing drilling operations based on the operational data.

BRIEF DESCRIPTION OF THE DRAWINGS

The advantages of the present invention are better understood by referring to the following detailed description and the attached drawings.

DETAILED DESCRIPTION

Figure 1:
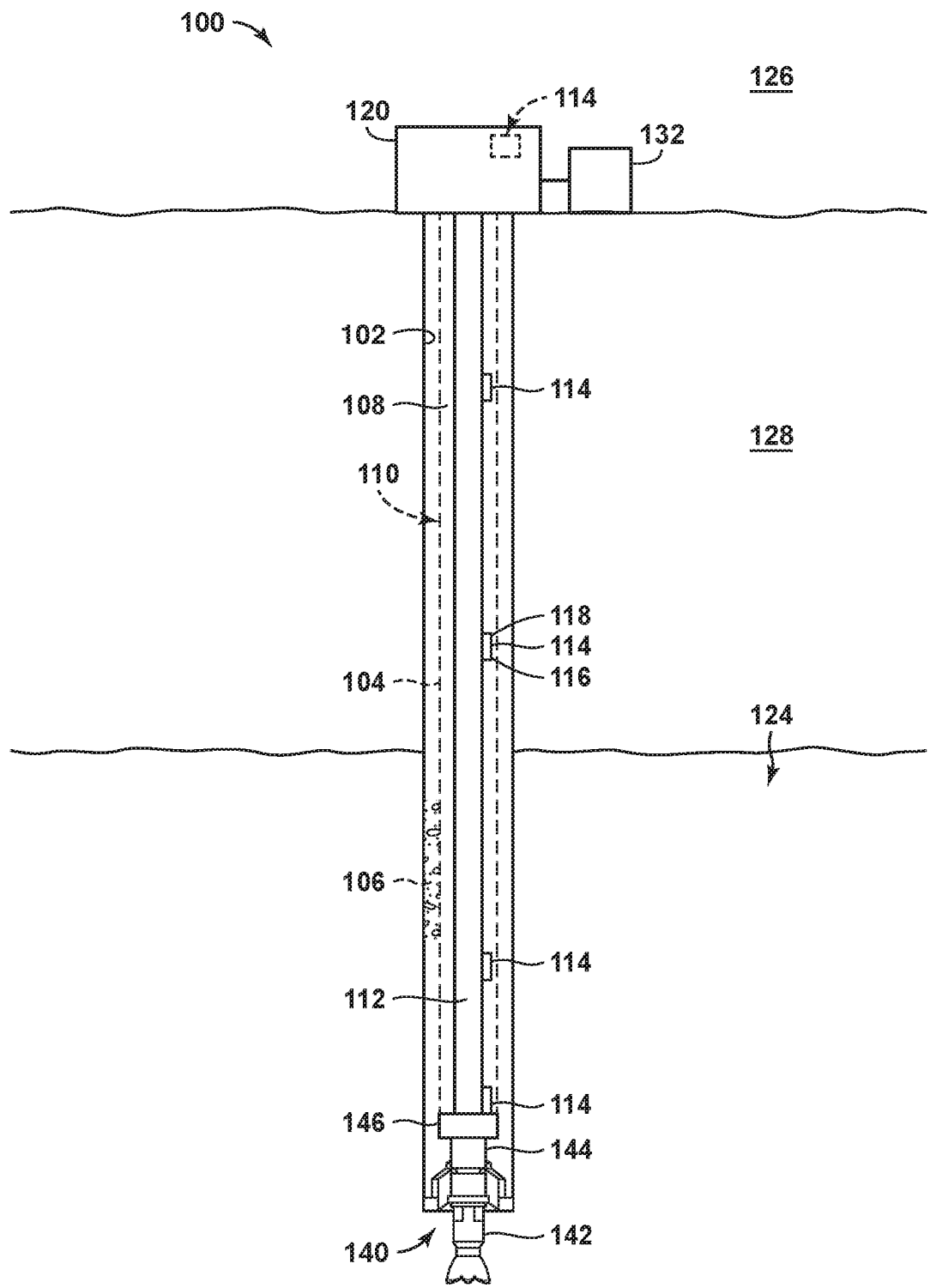
FIG. 1 is a schematic representation of a well configured to utilize the methods according to the present disclosure.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The articles "the", "a", and "an" are not necessarily limited to mean only one, but rather are inclusive and open ended so as to include, optionally, multiple such elements.

The directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

As used herein, the term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, "any" means one, some, or all indiscriminately of whatever quantity.

As used herein, "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, "based on" does not mean "based only on", unless expressly specified otherwise. In other words, the phrase "based on" describes both "based only on," "based at least on," and "based at least in part on."

As used herein, "conduit" refers to a tubular member forming a channel through which something is conveyed. The conduit may include one or more of a pipe, a manifold, a tube or the like. Any use of any form of the terms "connect", "engage", "couple", "attach", or any other term describing an interaction between elements is not meant to limit the interaction to direct interaction between the elements and may also include indirect interaction between the elements described.

As used herein, "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

As used herein, "exemplary" is used exclusively herein to mean "serving as an example, instance, or illustration." Any embodiment described herein as "exemplary" is not necessarily to be construed as preferred or advantageous over other embodiments.

As used herein, "formation" refers to any definable subsurface region. The formation may contain one or more hydrocarbon-containing layers, one or more non-hydrocarbon containing layers, an overburden, and/or an underburden of any geologic formation.

As used herein, "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$), and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models, and determining the likely locations for hydrocarbon reservoirs within the subsurface.

The measurement data may include seismic data, gravity data, magnetic data, electromagnetic data, and the like. The hydrocarbon exploration activities may include drilling operations, such as drilling exploratory wells.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production, determining and planning equipment to be utilized and techniques to be utilized in extracting the hydrocarbons from the subsurface formation, and the like.

As used herein, "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° Celsius (C) and 1 atmospheric (atm) pressure). Hydrocarbon fluids may include, for example, oil, natural gas, gas condensates, coal bed methane, shale oil, shale gas, and other hydrocarbons that are in a gaseous or liquid state.

As used herein, "hydrocarbon operations" refers to any activity associated with hydrocarbon exploration, hydrocarbon development and/or hydrocarbon production.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example, chemicals, hydraulic fracturing the wellbore to promote increased flow, well servicing, well logging, and other well and wellbore treatments. The hydrocarbon production operations may include drilling operations, such as drilling additional wells for injection and/or production operations, which may be subsea wells, from a drilling platform or surface location.

As used herein, "operatively connected" and/or "operatively coupled" means directly or indirectly connected for transmitting or conducting information, force, energy, or matter.

As used herein, "optimal", "optimizing", "optimize", "optimality", "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; and/or 6) seeking to maximize one or more factors in light of competing and/or cooperative interests in maximizing, minimizing, or otherwise controlling one or more other factors, etc.

As used herein, "potting" refers to the encapsulation of electrical components with epoxy, elastomeric, silicone, or asphaltic or similar compounds for the purpose of excluding moisture or vapors. Potted components may or may not be hermetically sealed.

As used herein, "range" or "ranges", such as concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, "sealing material" refers to any material that can seal a cover of a housing to a body of a housing sufficient to withstand one or more downhole conditions including but not limited to, for example, temperature, humidity, soil composition, corrosive elements, pH, and pressure.

As used herein, "sensor" includes any electrical sensing device or gauge. The sensor may be capable of monitoring or detecting pressure, temperature, fluid flow, vibration, resistivity, or other formation data. Alternatively, the sensor may be a position sensor.

As used herein, "stream" refers to fluid (e.g., solids, liquid and/or gas) being conducted through various regions, such as equipment and/or a formation. The equipment may include conduits, vessels, manifolds, units or other suitable devices.

As used herein, "subsurface" refers to geologic strata occurring below the earth's surface.

As used herein, "tubular member" or "tubular body" refer to any pipe, such as a joint of casing, a portion of a liner, a drill string, a production tubing, an injection tubing, a pup joint, a buried pipeline, underwater piping, or above-ground piping. Solid lines therein, and any suitable number of such structures and/or features may be omitted from a given embodiment without departing from the scope of the present disclosure.

As used herein, "wellbore" or "downhole" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

As used herein, "zone", "region", "container", or "compartment" is a defined space, area, or volume contained in the framework or model, which may be bounded by one or more objects or a polygon encompassing an area or volume of interest. The volume may include similar properties.

The exchange of information may be used to manage the operations for different technologies. By way of example, the communication network may include communication nodes disposed along one or more tubular members. The communication nodes may be distributed along tubular members, such as drilling string within a wellbore to enhance associated operations. To exchange information, the communication network may include physically connected communication nodes, wirelessly connected communication nodes or a combination of physically connected communication nodes and wirelessly connected communication nodes. However, the noise from the hydrocarbon operations interferes with communications.

By way of example, the communication network may be used for data exchanges of operational data, which may be used for real-time or concurrent operations involving drilling operations as part of hydrocarbon exploration operations, hydrocarbon development operations, and/or hydrocarbon production operations, for example. The system or method may involve communicating via a downhole network including various communication nodes spaced-apart along a length of tubular members, which may be a tone transmission medium (e.g., conduits). The communication nodes may communicate with each other to manage the exchange of data within the wellbore and with a computer system that is utilized to manage the hydrocarbon operations. For example, the communication network may involve transmitting and/or receiving signals or tones via one or more frequencies of acoustic tones in the form of data packets via the drilling string. The downhole wireless communication through the drilling string may be beneficial for enhancing hydrocarbon operations, such as optimizing drilling. In such communications, the communication network may include communication nodes that utilize ultrasonic acoustic frequencies to exchange information. The ultrasonic frequencies may provide a mechanism to transmit signals or tones during drilling operations because the signals do not hinder communication because the frequencies of the noise are well below the ultrasonic frequencies of the communication.

The communication nodes may include a housing that isolates various components from the wellbore environment. For example, the communication nodes may include one or more encoding components, which may be configured to generate and/or to induce one or more acoustic tones via a tone transmission medium, such as a drilling string. In addition, the communication nodes may include one or more decoding components, which may be configured to receive and/or decode acoustic tones from the tone transmission medium. The decoding components may include filters to modify the received signals, which may include a high pass filter to eliminate and/or reduce the noise, for example. The communication nodes may include one or more power supplies configured to supply power to the other components, such as batteries. The communication nodes may include one or more sensors, which may be configured to obtain measurement data associated with the downhole environment, the formation and/or the drilling equipment. The communication nodes may include relatively small transducers to lessen the size and energy demand of the communication nodes, such that each of the communication nodes may be disposed or secured to locations having limited clearance, such as between successive layers of downhole tubular members. The smaller transducers have higher acoustic resonant frequencies compared to larger transducers and thus use less energy to send acoustic signals around the resonant frequency band as compared with the larger transducers.

In certain application, obtaining measurements while drilling (e.g., concurrently or simultaneously during performing drilling operations) may be useful for drilling operations. One of the problems in performing such communication is the transmission of the measurement data to the surface equipment and operators and receiving of instructions at the drilling equipment. The telemetry technologies may include mud-pulse technologies, electromagnetic technologies, and low-frequency acoustic technologies. The conventional telemetry technologies, because of low frequency waves used for coding, have issues with low data rates and long latencies, which limits their effectiveness and are areas that need enhancements. For example, to avoid the effect of background noise, the telemetry technologies usually require interruption of drilling operations to perform data communication. Accordingly, ultrasonic communication may be feasible and may provide significant advantages over other wireless communication methods because the technology may provide signals that are detectable over the drilling noise, as compared with conventional systems. In addition, the present techniques may provide compact size of the communication nodes structure, may consume lower amounts of energy, may provide higher date rates, may shorten data latency in communications and may be more reliable compared to conventional system. The higher data rates and shorter data latency may enhance drilling operations because the communications may be substantially fast or nearly real-time communication, which may be during the drilling operations. Such communication may provide operators with downhole information to change drilling parameters for faster and more efficient drilling. For example, the acoustic noises generated between the drilling bit and rock may also be used directly to infer the rock properties; detection of impeding changes in mechanical properties (e.g., strength of the subsurface formation) of rocks near drilling bit and providing a rapid notification to a control unit (e.g., an operator at a display of the control unit) may provide flexibility to manage drilling operations in real time or concurrently during drilling operations. For example, the notifications may be used to change the drilling revolutions per minute (RPM), or weight on bit to avoid damage of the drilling bit.

To manage the transmission and reception of signals, the communication nodes may include a processor that operates to manage the communications along one or more tubular members, such as drilling strings. For example, the present techniques may utilize ultrasonic communication system for drilling operation. The system may include a number of communication nodes disposed along the drilling string. Each communication node may include one or more encoding components (e.g., transmitters) and one or more decoding components (receivers) that are configured to transmit and receive data packets represented by ultrasonic frequencies. The communication frequencies utilized on the communication network by the communication nodes may be selected so that the signals are well above the background noise that may include mud flow noise, rotating machine vibrational noise, rock-cutting noise, traffic noise and any other noises that may be present during drilling operations. The separation between communication frequencies and background noise frequencies may allow the ultrasonic communication without interruption of the drilling operation, which is beneficial.

The present techniques provide a mechanism for exchanging data packets through a communication network of communication nodes through the use of a specific transducer configuration that provides generation of certain preferred propagation mode of ultrasonic guided waves and directional communication. In this configuration, directional acoustic transducers are utilized in the communication nodes to provide ultrasonic wave propagation in specific directions, while minimizing the signals traversing in non-preferred directions. The directional communication may increase the range and signal-to-noise ratio. The communication nodes may include angle transducers to assist in managing the transmission of the signals. The communication nodes may include an array of the transducers in a node to generate selected modes of guided wave with non-dispersive or less-dispersive, and less-attenuation propagation for a long distance along the tubular members, such as a drilling string. By way of example, the communication nodes may be able to exchange data packets between communication nodes spaced apart by distances of more than 200 feet or even more than 1,000 feet. The present techniques may also involve adjusting the shape of the communication nodes to provide the communication nodes that do not impede the drilling operation, and drilling operation does not damage the communication nodes. In addition, the present techniques may include specific placement of the communication nodes on the tubular members, such as the drilling string, so that the primary communication path is inner portion of the drilling string or interior drilling mud. As yet another enhancement, the present techniques may include robust signal processing to remove the effect of high-intensity background noise for robust communication, which may include additional filtering in the communication nodes. In other configurations, directional transducers and/or non-directional transducers may be used alone or in combination with the arrays.

The communication nodes may include different configurations to address specific problems with specific applications. By way of example, the acoustic communication nodes may be retrieved and reused for drilling operations, the communication nodes may have less stringent limitations on power usage and cost associated with the communication nodes as compared to usage for other permanent downhole applications of well completion and production. As a result, communication nodes may be configured to be more powerful, provide longer range of data exchanges and near real-time communication system for drilling.

Because of the downhole environment associated with the tubular member, such as a drilling strings within a wellbore (e.g., liquid on both sides of the drilling string wall), the communication nodes may include an array configuration to manage the ultrasonic transmissions. The communication nodes may include different modes to manage the direction of the transmission of signals. For example, an omnidirectional mode may be utilized to transmit one or more signals that may propagate along both directions along the tubular member while the directional mode may be utilized to propagate the one or more signals in one direction or another. For even longer transmission along the drilling string, the transducer array may be configured to generate certain preferred guided wave mode, such as T0 mode because the T0 mode is non-dispersive (e.g., no spreading, no pulse contamination, high fidelity of zero-crossing signal) and minimal leakage loss to the surrounding liquid because it includes completely shear waves. Examples of T0 mode are provided further in U.S. Patent Application Publication No. US2018/0058206, which is herein incorporated by reference. However, the transducer array has the capability of re-configuring to generate other type of modes, such as higher order torsional modes or even longitudinal modes if needed, for example, when the borehole condition changes and T0 mode is less effective.

In addition to the tubular member as an acoustic communication media, the fluids associated with the tubular member may also be used as an acoustic communication media. For example, the drilling mud inside or outside of the drilling string may be used as the transmission media. The use of water within a wellbore has been utilized to propagate an ultrasonic wave in water within the well for over 400 feet. As a result, the communication distance through water using ultrasonic frequency may be utilized to provide a longer communication distance than may be achieved in tubular members. The present techniques may also include an ultrasonic acoustic band for higher data communication rates and larger separation distances between each communication node in water or drilling mud. Beneficially, the present techniques provide substantially or nearly real-time communication and high-data-rate communication between the bottomhole assembly and the surface equipment.

In the directional communication mode, the transmission of the signals may be non-dispersive guided acoustic waves (NDGAW). For such configurations, communication nodes may include electro-acoustic transducer arrays (e.g., transmitter arrays) to induce non-dispersive guided acoustic waves within the elongate tubular body of the tubular member. Such NDGAWs may be aligned with the elongate axis of the elongate tubular body and/or may be directional in nature. To induce such NDGAWs, an electro-acoustic transducer array may induce the NDGAW along the tubular body.

In contrast to single transducer configurations, the electro-acoustic transducer array includes two or more transducers. In such an array configuration, each of the communication nodes may be operatively attached to a tubular member and includes an encoding component that is configured to transmit a signal and dampen the transmitted signal in a one direction. The encoding component may include two or more electro-acoustic transducers circumferentially spaced apart, or equally spaced apart, about a perimeter of a tubular member. Each electro-acoustic transducer may include and/or be any suitable structure, examples of which include a piezoelectric transmitter stack, an in-plane shear d36-type PMNT piezoelectric wafer, and/or an electromagnetic acoustic transmitter. When electro-acoustic transducers include piezoelectric stacks, the piezoelectric transmitter stack may include any suitable number of stacked piezoelectric transmitter wafers, including at least two stacked piezoelectric transmitter wafers, at least three stacked piezoelectric transmitter wafers, at least four stacked piezoelectric transmitter wafers, or at least five stacked piezoelectric transmitter wafers. Electro-acoustic transducers are configured to induce a transmitted acoustic wave, in the form of a non-dispersive guided acoustic wave (NDGAW), within tubular member, such as the elongate tubular body.

In certain configurations, the array configuration may include one or more rings of transducers may be disposed on the surface of a tubular member (e.g., the interior surface, the exterior surface and/or a combination thereof). For example, the configuration may include a single ring of transducers along with wedged couplings for omnidirectional wave generation. Other configurations may include two or more rings of transducers to provide directional wave generation. As a specific example in a preferred configuration, the array configuration may include the formation of two or more rings of electro-acoustic transducers, with each of the ring composed of two or more electro-acoustic transducers circumferentially spaced apart, or equally spaced apart, about a perimeter of a tubular member. The array configuration may include various transducers that communicate with a communication node controller and/or has a ring controller that manages each of the rings of transducers. For example, the array configuration may include two rings of electro-acoustic transducers disposed along the exterior surface of the drilling string (e.g., the surface external to the internal fluid flow passage). Each of the rings of the electro-acoustic transducers may be circumferentially spaced apart, or equally spaced apart, about a perimeter of a tubular member and may be configured to operate with each other to manage the directional communication. In one configuration, two rings of electro-acoustic transducers may be utilized to provide directional transmissions. A first ring of electro-acoustic transducers may generate signals, while the second ring of electro-acoustic transducers may be utilized to generate signals that cancel out the signals generated by the first ring of electro-acoustic transducers. In yet another configuration, three rings of electro-acoustic transducers may be used to provide directional transmissions. Similar to the two ring configuration, a first ring of electro-acoustic transducers may generate signals, while the second ring of electro-acoustic transducers and third ring of electro-acoustic transducers may be utilized to each generate signals that cancel out or minimize the signals generated by the first ring of electro-acoustic transducers. Beneficially, in this configuration, the cancelation signals may be distributed between two rings of electro-acoustic transducers.

Omnidirectional acoustic wave can be generated along a tubular member, such as a drilling string. One mechanism to generate directional acoustic signals or waves may involve using angle beam transducers, which may be configured in an array. Each angle beam transducer includes a transducer and a wedge to couple acoustic wave into the pipe at a selected angle. By controlling each element width, spacing, acoustic frequency and bandwidth of excitation, and relative time delay of activation on each transducer, an omnidirectional acoustic wave may be generated along the tubular member. To generate bidirectional acoustic waves for communication along opposite directions, two arrays with different angle beam adaptors may be used. Accordingly, the exchange of data (e.g. the communications) may involve omnidirectional transmissions or directional transmissions, which may be based on the preferred mode of communication for a data packet or communication node. Other configurations may include one or more non-directional transducers may be used to generate bidirectional acoustic waves for communication along opposite directions.

In certain configurations, the physical implementation of the communication node may include a collar that are disposed around or are wrapped around the tubular member, the transducers and the associated electronic control circuits, and power batteries may be included in the collar for communication among the transducers. The transducers may be used as signal transmitters and/or signal receivers, depending on their electronic circuit connections. The collar may include multiple arrays, such as a first array for receiving signals and two or more arrays for transmitting signals. As noted above, the arrays used for transmission of the signals may transmit the signals in an omnidirectional mode or a directional mode. In addition, the array can be figured to generate specific mode of guided waves as needed. The transducer types may be piezoelectric transducers and/or electro-magnetic acoustic transducers.

Accordingly, the present techniques may enhance the hydrocarbon operations through the use of specific configuration of communication nodes in a communication network. For example, in one or more embodiments, a method of communicating data among a plurality of communication nodes along one or more drilling strings is described. The method comprising: creating a communication network, wherein the communication network comprises a plurality of communication nodes, wherein each of the plurality of communication nodes are configured to transmit signals between two or more of the plurality of communication nodes along one or more drilling strings while concurrently performing drilling operations; disposing the plurality of communication nodes along the one or more drilling strings; communicating operational data between two or more of the plurality of communication nodes during drilling operations; and performing drilling operations based on the operational data.

In other configurations, the method may include various enhancements. The method may include wherein each of the plurality of communication nodes are configured to transmit signals between two or more of the plurality of communication nodes along one or more drilling strings in an omnidirectional mode or a directional mode, and wherein the transmission of the operational data is performed in a directional mode or in an omnidirectional mode; wherein each of the plurality of communication nodes comprise one or more transducers; wherein each of the plurality of communication nodes comprise a first ring of transducers and a second ring of transducers; wherein each of the transducers is disposed within a separate housing and communicates with a primary communication node controller to manage the transmission of signals; wherein each of the plurality of communication nodes is configured as a collar that is disposed around one of the one or more drilling strings and comprise transducers; wherein the transducers are circumferentially spaced apart about a perimeter of one of the one or more drilling strings; wherein the transducers are equidistantly spaced apart about a perimeter of one of the one or more drilling strings; wherein each of the plurality of communication nodes in the directional mode transmit a signal with the first ring of transducers and dampens the transmitted signal with the second ring of transducers; wherein each of the plurality of communication nodes generates dominantly symmetric shear wave mode (T0); wherein each of the plurality of communication nodes generates dominantly torsional wave mode or longitudinal wave mode; wherein the communicating operational data between the two or more of the plurality of communication nodes comprises: receiving one or more signals in one of the plurality of communication nodes, and filtering the one or more signals using a high pass filter to lessen background noise from the one or more signals in the one of the plurality of communication nodes; further comprising: i) monitoring the communication network for an event, ii) modifying one or more of the plurality of communication nodes to the directional mode if an event is detected, and iii) continuing communicating between the two or more of the plurality of communication nodes if an event is not detected, and iv) repeating steps i) to iii) until the hydrocarbon operations are complete; further comprising disposing the plurality of communication nodes and the one or more drilling strings within a wellbore; wherein communicating operational data between two or more of the plurality of communication nodes during drilling operations further comprises transmitting the operational data through a portion of the drilling string between two or more of the plurality of communication nodes; wherein communicating operational data between two or more of the plurality of communication nodes during drilling operations further comprises transmitting the operational data through a portion of the fluid adjacent to the drilling string between two or more of the plurality of communication nodes; further comprising monitoring wear on the drill bit, and wherein the communicating operational data between two or more of the plurality of communication nodes during drilling operations further comprises transmitting the monitored wear data to a control unit; further comprising monitoring position of the drill bit, and wherein the communicating operational data between two or more of the plurality of communication nodes during drilling operations further comprises transmitting the monitored position data to a control unit; further comprising monitoring temperature near the drill bit, and wherein the communicating operational data between two or more of the plurality of communication nodes during drilling operations further comprises transmitting the monitored temperature data to a control unit; further comprising monitoring vibration near the drill bit, and wherein the communicating operational data between two or more of the plurality of communication nodes during drilling operations further comprises transmitting the monitored vibrational data to a control unit and/or wherein the communicating operational data between two or more of the plurality of communication nodes during drilling operations comprises communicating at frequencies greater than 50 kilo hertz or at frequencies greater than 200 kilo hertz.

In another configuration, a system for communicating along one or more drilling strings is described. The system may comprise: one or more drilling strings; a bottomhole assembly coupled to the drilling string; and a communication network coupled to the one or more drilling strings, wherein the communication network comprises a plurality of communication nodes, wherein each of the plurality of communication nodes are configured to communicate operational data between two or more of the plurality of communication nodes during drilling operations.

In other configurations, the system may include various enhancements. The system may include wherein the each of the plurality of communication nodes are configured to transmit the operational data in a omnidirectional mode or a directional mode based on a transmission setting; wherein each of the plurality of communication nodes comprise a first ring of transducers and a second ring of transducers; wherein each of the transducers is disposed within a separate housing and communicates with a primary communication node controller to manage the transmission of signals; wherein each of the plurality of communication nodes is configured as a collar that is disposed around one of the one or more drilling strings and comprise transducers; wherein the transducers are circumferentially spaced apart about a perimeter of one of the one or more drilling strings; wherein the transducers are equidistantly spaced apart about a perimeter of one of the one or more drilling strings; wherein each of the plurality of communication nodes in the directional mode transmit a signal with the first ring of transducers and dampens the transmitted signal with the second ring of transducers; wherein each of the plurality of communication nodes generates dominantly symmetric shear wave mode (T0); wherein each of the plurality of communication nodes generates dominantly torsional wave mode or longitudinal wave mode; wherein each of the plurality of communication nodes is configured to: receive one or more signals, and determine whether the one or more signals indicate that the communication node enter the directional mode; wherein each of the plurality of communication nodes are further configured to: receive one or more signals, and filter the one or more signals using a high pass filter to lessen background noise from the one or more signals; wherein each of the plurality of communication nodes are further configured to: i) monitor the communication network for an event, ii) modify one or more of the plurality of communication nodes to the directional mode if an event is detected, iii) continue communicating with the two or more of the plurality of communication nodes if an event is not detected, and iv) repeat steps i) to iii) until the hydrocarbon operations are complete; wherein the plurality of communication nodes and the one or more drilling strings are disposed within the wellbore; wherein the plurality of communication nodes and the one or more tubular members are disposed along the drilling string; wherein each of the plurality of communication nodes are configured to transmit the operational data through a portion of the drilling string between two or more of the plurality of communication nodes; wherein each of the plurality of communication nodes are configured to transmit the operational data through a portion of the fluid adjacent to the drilling string between two or more of the plurality of communication nodes; wherein one or more of the plurality of communication nodes are configured to: monitor wear on the drill bit, and transmit the monitored wear data to a control unit; wherein one or more of the plurality of communication nodes are configured to: monitor position of the drill bit, and transmit the monitored position data to a control unit; wherein one or more of the plurality of communication nodes are configured to: monitor temperature near the drill bit, and transmit the monitored temperature data to a control unit; wherein one or more of the plurality of communication nodes are configured to: monitor vibration near the drill bit, and transmit the monitored vibration data to a control unit; and/or wherein one or more of the plurality of communication nodes are configured to: communicate at frequencies greater than 50 kilo hertz or at frequencies greater than 200 kilo hertz.

In yet another configuration, a method of communicating data among a plurality of communication nodes along one or more tubular members is described. The method comprising: creating a communication network, wherein the communication network comprises a plurality of communication nodes, wherein each of the plurality of communication nodes are configured to transmit signals between two or more of the plurality of communication nodes along one or more tubular members in an omnidirectional mode or a directional mode; disposing the plurality of communication nodes along the one or more drilling strings; communicating operational data between two or more of the plurality of communication nodes, wherein the transmission of the operational data is performed in a directional mode or in an omnidirectional mode; and performing drilling operations based on the operational data.

Beneficially, the present techniques provide various enhancements to the drilling operations. The present techniques provide a mechanism for nearly real-time or concurrent communications and the data rate of the communication between communication nodes near drill bit and surface control unit may be higher than conventional systems. For example, the present techniques provide a mechanism for exchanging information without stopping or interrupting the drilling operation. In particular, the high frequency telemetry may also provide communications during horizontal drilling, which is not performed using conventional methods, such as mud pulsing. For drilling operations, the acoustic communication nodes may be reused, which may lessen the restrictions or limitations on power, and because cost may be amortized across the drilling of multiple wells, the cost is more relaxed relative to communication nodes designed for downhole application in a single well completion and production. Thus, the communication nodes may provide configurations a more powerful, long-range and near real-time communication system for drilling. The configurations may include replacing and/or recharging the power source (e.g., batteries) for the communication nodes. Also, the present techniques may provide fault tolerance that is not be available in conventional wireless system.

Further benefits, the present techniques provide the ability to transmit in either a directional transmission mode or omnidirectional transmission mode depending on the environment and communication configuration. The selection in the mode of transmission provides a mechanism to manage the distance of the transmissions and/or ability to manage transmissions relative to noise in transmission. In such a configuration, the communication nodes may be configured to select the mode of the transmissions to enhance the management of the communication network.

Further still, because of the drilling environment associated with the drilling string (e.g., fluids within the drilling string and external to the drilling string), the communication nodes may include ultrasonic transducers (configured as transmitters and receivers) configured in an array to operate in a T0 mode, a particular torsional mode T0 mode may be preferable for long-range guided wave propagation along the drilling string wall or surfaces because it is non-dispersive (e.g., no spreading, no pulse contamination, and/or provides a high fidelity of zero-crossing signal) and involves minimal leakage loss to the surrounding fluids because T0 mode utilizes shear waves. If necessary, other higher order torsional mode or even longitudinal mode could be generated by the certain configuration of transduces in the array. Other than using the drilling sting as acoustic communication media, the drilling mud inside or outside of the drilling string may be used individually or in addition to the drilling string. The fluid communication may be used for longer communication distances. Also, the acoustic communication nodes may be reused so that the restriction on power and cost may be lessened as compared to permanent downhole applications associated with a well completion operations and production operations. Thus, the configuration may be more powerful, long-range and near real-time communication system for drilling. Accordingly, the present techniques may be further understood with reference to FIGS. 1 to 6, which are described further below.

FIG. 1 is a schematic representation of a well 100 configured that utilizes a communication network having the proposed configuration of communication nodes. The well 100 includes a wellbore 102 that extends from surface equipment 120 to a subsurface region 128. Wellbore 102 also may be referred to herein as extending between a surface region 126 and subsurface region 128 and/or as extending within a subterranean formation 124 that extends within the subsurface region. The wellbore 102 may include a plurality of tubular sections, which may be formed of carbon steel, such as a casing or liner. Subterranean formation 124 may include hydrocarbons. The well 100 may be utilized for a hydrocarbon well, a production well, and/or an injection well.

Well 100 also includes an acoustic wireless communication network. The acoustic wireless communication network also may be referred to herein as a downhole network or communication network that includes various communication nodes 114 and a topside communication node and/or control unit 132. The communication nodes 114 may be spaced-apart along a drilling string 112 that extends along a length of wellbore 102. In the context of well 100, the tone transmission medium may include drilling string 112 that may extend within wellbore 102, a downhole tubular 110 that may extend within wellbore 102, a wellbore fluid 104 that may extend within wellbore 102, a portion of subsurface region 128 that is proximal wellbore 102, a portion of subterranean formation 124 that is proximal wellbore 102, and/or a cement 106 that may extend within the wellbore 102 and/or that may extend within an annular region between wellbore 102 and downhole tubular 110. Downhole tubular 110 may define a fluid conduit 108.

For drilling operations, the surface equipment 120 may include a derrick and associated equipment. For example, the derrick may include a frame structure that supports drilling equipment including a traveling block, a crown block and a swivel. A kelly may be attached to the swivel and have a longitudinally extending bore (not shown) in fluid communication with a kelly hose, which may be a flexible, steel-reinforced, high-pressure hose that delivers drilling fluid through the bore of the kelly and down into the drill string 112, the downhole tubular 110 or a conduit in the fluid conduit 108 in certain configurations. The kelly may include a drive section that longitudinally extends through a kelly drive bushing, which is part of a rotary table (e.g., a mechanically driven device) that provides rotational force to the kelly and connected drill string to facilitate the process of drilling a borehole. The linear and rotational movement may thus be imparted from the kelly to the drill string 112. In addition, the derrick may include various components of drilling equipment, such as pumps, motors, gauges, a dope bucket, tongs, pipe lifting equipment and control equipment. Further still, a kelly-drive section may include a blow-out preventer, which is a large, specialized valve or set of valves used to control pressures during the drilling of oil and gas wells. Specifically, the blowout preventers control the fluctuating pressures emanating from subterranean formations during a drilling process, which may include upper and lower rams used to isolate flow on the back side of the drill string 112 and may also protect the pipe joints that are part of the drill string 112.

The bottomhole assembly 140 may be coupled to the drilling string 112. The bottomhole assembly 140 may include a drill bit 142, one or more downhole motors 144 and one or more drilling controllers 146. The drill bit 142 may be turned by rotating the downhole tubular 110 or using the downhole motors 144. The downhole motors 144 are mechanically coupled to and turn the associated drill bit 142, which may include the use of stabilizers or bent subs (not shown) to impart an angular deviation to the drill bit 142.

To provide directional drilling, the downhole motors 144 and drilling controller 146 along with other associated equipment may be used to manage the deviations in the well along its path in the desired azimuth and inclination through the use of directional drilling. The drilling controller 146 may include equipment (e.g., control unit, gears, motors or other components) to adjust the direction of the drill bit 142. The directional drilling provides the ability to complete a wellbore along a substantially horizontal axis of a subsurface formation, which may expose a larger amount of the formation face. By managing the deviations, additional flexibility is provided to penetrate subsurface formations that are not located directly below the wellhead. This is particularly beneficial when the positioning of the pad locations is limited or presents certain challenges, such as when an oil reservoir is located under an urban area or under a large body of water. Moreover, directional drilling may provide the ability to group multiple wellheads on a single platform, such as for offshore drilling. Finally, directional drilling provides flexibility in configuring a well system to access various regions from a single well, which may include multiple laterals and/or sidetracks to be drilled from a single wellbore to maximize reservoir exposure and recovery of hydrocarbons.

The drilling controller 146 may also include communication nodes, such as communication node 114, and various sensors (not shown) to obtain measurement data associated with the drilling operations and communicate with the control unit 132. The measured data may include operating conditions within the bottomhole assembly, properties of the drilling fluids and/or properties of the subsurface region. The sensors may be disposed on or part of the bottomhole assembly 140. The sensors may include one or more position sensors configured to determine the direction and location of the bottomhole assembly 140, along with one or more temperature sensors, one or more pressure sensors, one or more accelerometers, or other sensors for detecting a downhole operating condition during drilling operations, and mechanical properties of the formation. Alternatively, the sensors may include an induction log component, gamma ray log component or other log components configured to detect fluid and/or geology downhole.

By way of example, the sensors may be part of a measurement while drilling (MWD) or a logging while drilling (LWD) assembly. Certain sensors may be located above the downhole motors 144. This location may be preferred to provide space or distance from the high vibration and centrifugal forces caused by the downhole motors 144, the rotating assembly below the motors, and the formation cutting action created at the drill bit 142. Where the sensor is a set of position sensors, the sensors may include three inclinometer sensors and three environmental acceleration sensors. Preferably, a temperature sensor and a wear sensor may also be placed in the drill bit 142. These signals from one or more of the sensors associated with the bottomhole assembly 140 may be communicated through the communication nodes 114. In certain configurations, the signals may be provided to a multiplexer and transmitted.

Communication nodes 114 may include various components to exchange data, which may utilize different transmission modes to enhance the operations. For example, the communication nodes may include one or more encoding components 116, which may be configured to generate an acoustic tone and/or to induce the acoustic tone within the respective tone transmission medium. The signals generated from the communication nodes 114 may be omnidirectional or directional, which may depend on the mode of the communication node for the transmission (e.g., directional mode or omnidirectional mode). Communication nodes 114 also may include one or more decoding components 118, which may be configured to receive acoustic tone from the tone transmission medium. A communication node 114 may function as both an encoding component 116 and a decoding component 118 depending upon whether the given node is transmitting an acoustic tone (e.g., functioning as the encoding component) or receiving the acoustic tone (e.g., functioning as the decoding component). The communication nodes 114 may include both encoding and decoding functionality, or structures, with these structures being selectively utilized depending upon whether or not the given communication node is encoding the acoustic tone or decoding the acoustic tone. In addition, the communication nodes 114 may include sensing components that are utilized to measure and monitor conditions within the wellbore 102.

In wells 100, transmission of acoustic tone may be along a length of wellbore 102. As such, the transmission of the acoustic tone may preferably be linear, at least substantially linear, and/or directed, such as by tone transmission medium. The generated tones or signals propagate both up the tubular member, down the tubular member and into the surrounding layers, such as cement, casing, drilling string, liquid inside the casing or drilling string, and the formation, to varying degrees depending on the acoustic impedance of the material. Such a configuration may contrast to more conventional wireless communication methodologies, which generally may transmit a corresponding wireless signal in a plurality of directions, or even in every direction.

The communication node 114, which are discussed in more detail herein, are disclosed in the context of the well 100, such as a hydrocarbon well, which may be used for drilling operations. However, it is within the scope of the present disclosure that these methods may be utilized to communicate via acoustic tones in any suitable communication network, which may include one or more acoustic wireless networks. As examples, the acoustic wireless network may be used in a subsea well and/or in the context of a subsea tubular that extends within a subsea environment, which has background noises that interfere with certain communications. Under these conditions, the tone transmission medium may include, or be, the subsea tubular and/or a subsea fluid that extends within the subsea environment, proximal to the subsea tubular, and/or within the subsea tubular. As another example, the communication network in the context of a surface tubular may extend within the surface region. Under these conditions, the tone transmission medium may include, or be, the surface tubular and/or a fluid that extends within the surface region, proximal to the surface tubular, and/or within the surface tubular. Accordingly, the present techniques may be used to overcome background noise that interferes with communications.

The plurality of frequencies, which are utilized in the communication nodes 114, may include the different frequencies for the hydrocarbon operations. The respective frequency ranges may be any suitable values. As examples, each frequency in the plurality of frequencies may be at least 50 kilohertz (kHz), at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, each frequency in the plurality of frequencies may be at most 1,000 kHz (1 megahertz), at most 800 kHz, at most 600 kHz, at most 400 kHz, at most 200 kHz, or at most 150 kHz.

Figure 2A:
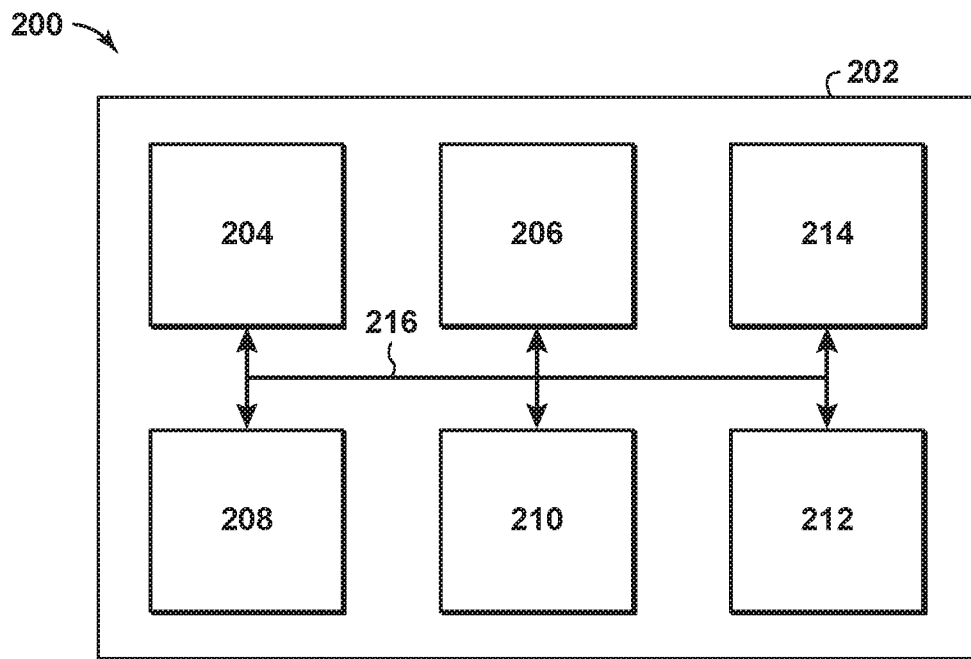
FIGS. 2A and 2B are exemplary views of communication nodes of FIG. 1.
Figure 2B:
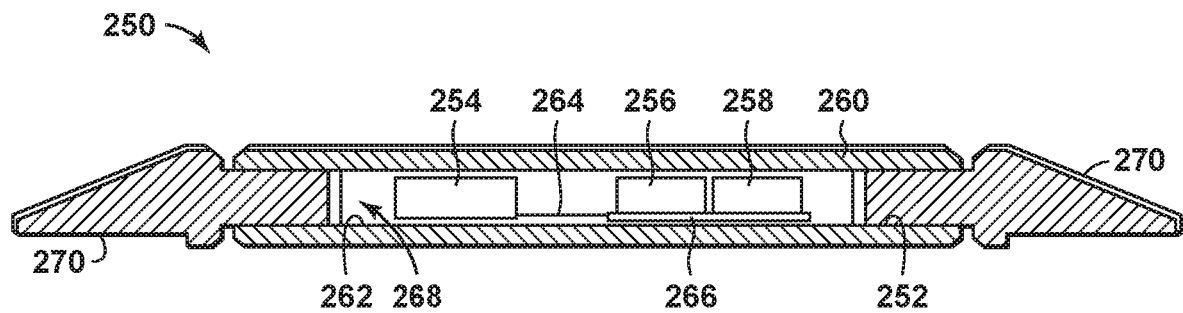

The communication nodes 114 may include various configurations, such as those described in FIGS. 2A and 2B. Each of the communication nodes may be disposed along or on one of the tubular members, such as a drilling string, conduit and/or a tubular section within the wellbore. The communication nodes may be associated with equipment, may be associated with tubular members and/or may be associated with the surface equipment. The communication nodes may also be configured to attach at joints, internal surfaces of conduits, surfaces within the wellbore, or to equipment.

As a specific example, the communication nodes may be structured and arranged to attach to the surface of a drilling string at a selected location. The surface may be an internal surface or an exterior surface. This type of communication node may be disposed in a wellbore environment as a communication node between the surface and any communication nodes associated with the equipment. The communication nodes may be disposed on each tubular member, or may be disposed on alternative tubular members. By way of example, the communication node may be welded onto the respective surface or may be secured with a fastener to the tubular member (e.g., may be selectively attachable to or detachable from tubular member). The fastener may include the use of clamps (not shown), an epoxy or other suitable acoustic couplant may be used for chemical bonding. By attaching to the surface of the tubular member, the communication nodes may not interfere with the flow of fluids within the internal bore of the tubular section.

FIG. 2A is a diagram 200 of an exemplary communication node. The communication node 200 may include a housing 202 along with a central processing unit (CPU) 204, memory 206, one or more encoding components 208, one or more decoding components 210, a power component 212 and/or one or more sensing components 214, which communicate via a bus 216. The central processing unit (CPU) 204 may be any general-purpose CPU, although other types of architectures of CPU 204 may be used as long as CPU 204 supports the inventive operations as described herein. The CPU 204 may execute the various logical instructions according to disclosed aspects and methodologies. For example, the CPU 204 may execute machine-level instructions for performing processing according to aspects and methodologies disclosed herein. The CPU 204 may contain two or more microprocessors that operate at one or more clock speeds. The CPU 204 may be a system on chip (SOC), digital signal processor (DSP), application specific integrated circuits (ASIC), and field programmable gate array (FPGA), or a combination of these. The memory 206 may include random access memory (RAM), such as SRAM, DRAM, SDRAM, or the like, read-only memory (ROM), such as PROM, EPROM, EEPROM, or the like, and NAND flash and/or NOR flash. The one and/or more sensing components 214 may be configured to obtain sensing data and communicate the sensing data with the other communication nodes. Further, the power component 212 may be disposed in the housing 202 and may be configured to provide power to the other components. The power component 212 may include one or more batteries, capacitors, super-capacitors, or other energy storage components.

To manage the communications, the communication node 200 may utilize the one or more encoding components 208 and one or more decoding components 210 within the housing 202. The encoding components 208 may be disposed within the housing 202 and may be configured to generate an acoustic tones and/or to induce the acoustic tone within a tone transmission medium. The one or more decoding components 210 may be disposed within the housing 202 and may be configured to receive acoustic tones from the tone transmission medium.

The encoding components 208 and the decoding components 210 may manage the signals (e.g., the transmission or reception of the signals, respectively) through the operation of a processor. To provide the different modes of operation, such as the omnidirectional mode and the directional mode, the encoding component 208 may include an array configuration that includes two or more transducers. The transducers may include a piezoelectric transmitter stack, an in-plane shear d36-type PMNT piezoelectric wafer, and/or an electromagnetic acoustic transmitter. The array configuration may be configured to transmit a signal in one direction and dampen the transmitted signal in the opposite direction, if operating in directional mode. The relative phase among the multiple transducers in an array may be adjusted to generate specific mode of guided waves. The encoding component may include different transducers spaced apart along a tubular member, which may be disposed secured along the circumference of a tubular member. The array configuration may include transducers configured in one or more rings of transducers and/or collars having transducers. Each of the rings or collars of the transducers may be circumferentially spaced apart, or equidistantly or equally spaced apart, about a perimeter of a tubular member and may be configured to operate with each other to manage the directional communication. In particular, the ring or collar of transducers may be utilized to generate signals that lessen or cancel out the signals generated by the one of the other transducers. In certain configuration, the encoding component may be an array of a collar having two rings of transducers, three rings of transducers or even four rings of transducers. Other configurations may include angle beam transducers, which have a transducer and a wedge are used to provide a selected angle. By controlling each element width, spacing, acoustic frequency and bandwidth of excitation, and relative time delay of activation on each transducer, the acoustic wave may be generated along the tubular member. The angle beam transducers may be arranged into the configuration of arrays. Accordingly, the encoding components may provide omnidirectional transmissions or directional transmissions, which may be based on the preferred mode of communication for a data packet or communication node.

In yet another exemplary configuration, FIG. 2B is an exemplary cross sectional diagram of a communication node 250 that may be used in the system. The view of the communication node 250 is along the longitudinal axis. The communication node 250 includes a housing 252, which may be fabricated from carbon steel or other suitable material to avoid corrosion at the coupling. The housing 252 is dimensioned to provide sufficient structural strength to protect internal electronics. By way of example, the housing 252 has an outer wall 260, which may be about 0.2 inches (0.51 centimeters (cm)) in thickness. An interior region or cavity 262 houses the electronics, including, by way of example and not of limitation, a power source 254 (e.g., one or more batteries), a power supply wire 264, a first set of transducers 256, a second set of transducers 258, and a circuit board 266. The circuit board 266 may preferably include one or more micro-processors and/or one or more electronics modules that processes acoustic signals. Also, the set of transducers 256 and 258 may be electro-acoustic transducers.

For communication between communication nodes, the first set of transducers 256 and the second set of transducers 258 may be configured to convert acoustical energy to electrical energy (or vice-versa) and are acoustically coupled with outer wall 260 on the side attached to the tubular member. As an example, the first set of transducers 256, which may be configured to receive acoustic signals, and a second set of transducers 258, which may be configured to transmit acoustic signals (e.g., transmitter), are disposed in the cavity 262 of the housing 252. The first and second sets of transducers 256 and 258 provide a mechanism for acoustic signals to be transmitted and received from node-to-node, along the tubular members (e.g., either up the wellbore or down the wellbore or up a subsea pipe or down a subsea pipe). In certain configurations, the second set of transducers 258, which may be configured to serve as transmitters, for the communication nodes may also produce acoustic telemetry signals, which may be directional or omnidirectional. Also, an electrical signal is delivered to the set of transducers transducer 258 via a driver circuit. By way of example, a signal generated in one of the transducers, such as the second set of transducers 258, passes through the housing 252 to the tubular member, and propagates along the tubular member to other communication nodes. As a result, the transducers that generates or receives acoustic signals may be a magnetostrictive transducer (e.g., including a coil wrapped around a core) and/or a piezoelectric ceramic transducer. By way of example, the communication nodes may be configured to transmit using a smaller piezoelectric transducer at high-frequencies (in a preferred embodiment, around their resonant frequency bands), which may lessen the energy usage to transmit signals within the wellbore. Regardless of the specific type of transducer, the electrically encoded data are transformed into a sonic wave that is carried through the walls of a tubular member in the wellbore. Accordingly, the transducers may be configured to only receive signals, to only transmit signals or to receive signals and transmit signals.

Further, the internal components of the communication nodes 250 may include a protective layer 268. The protective layer 268 encapsulates the electronics circuit board 266, the cable 264, the power source 254, and transducers 256 and 258. This protective layer 268 may provide additional mechanical durability and moisture isolation. The communications nodes 250 may also be fluid sealed within the housing 252 to protect the internal electronics from exposure to undesirable fluids and/or to maintain dielectric integrity within the voids of a housing. One form of protection for the internal electronics is available using a potting material.

To secure the communication node to the tubular member, the communication nodes 250 may also optionally include a shoe 270. More specifically, the communication nodes 250 may include a pair of shoes 270 disposed at opposing ends of the wall 260. Each of the shoes 270 provides a beveled face that helps prevent the communication node 250 from hanging up on an external tubular body or the surrounding earth formation, as the case may be, during run-in or pull-out. The shoes 270 may also have an optional acoustic coupling material (not shown) under the protective outer layer 268.

In other configurations, the communication node may include various different housings that are configured to house the transducers for set of transducers and may communicate with each other. This configuration may be connected to the tubular member, as noted above, and may include cables to exchange communications between the electronics within the separate housings. In yet another configuration, the communication node may be configured to be in a within a single housing, as a collar configuration.

To enhance the performance, the communication nodes may be configured to provide a directional mode or an omnidirectional mode. The omnidirectional mode may involve transmitting the signal along the tubular member in two directions. This mode may include using at least one transducer or a ring of transducers or transmitters to provide the transmission of the signals. The directional mode may involve transmitting the signal in a primary direction. The directional mode may include using a set of transducers or rings of transducers to provide the transmission of the signals in a primary direction.

In the various communication nodes, the array configuration may include a communication node controller along with one or more ring controllers that are utilized to manage the respective transducers. In certain configurations, the communication node controller may be part of the CPU 204 or circuit board 266. For example, the array configuration may include various transducers that communicate with a communication node controller that manages the transducers and/or has a ring controller that manages each of the respective rings of transducers.

Figure 3A:
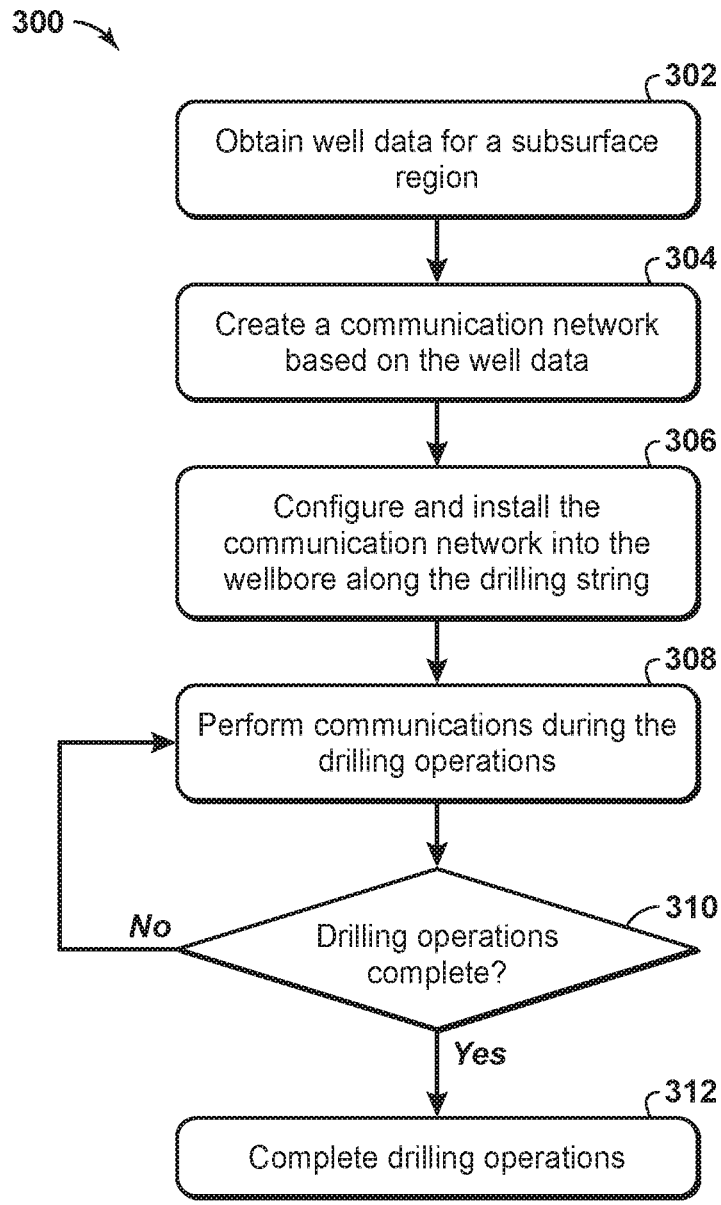
FIGS. 3A and 3B are exemplary flow charts in accordance with embodiments of the present techniques.
Figure 3B:
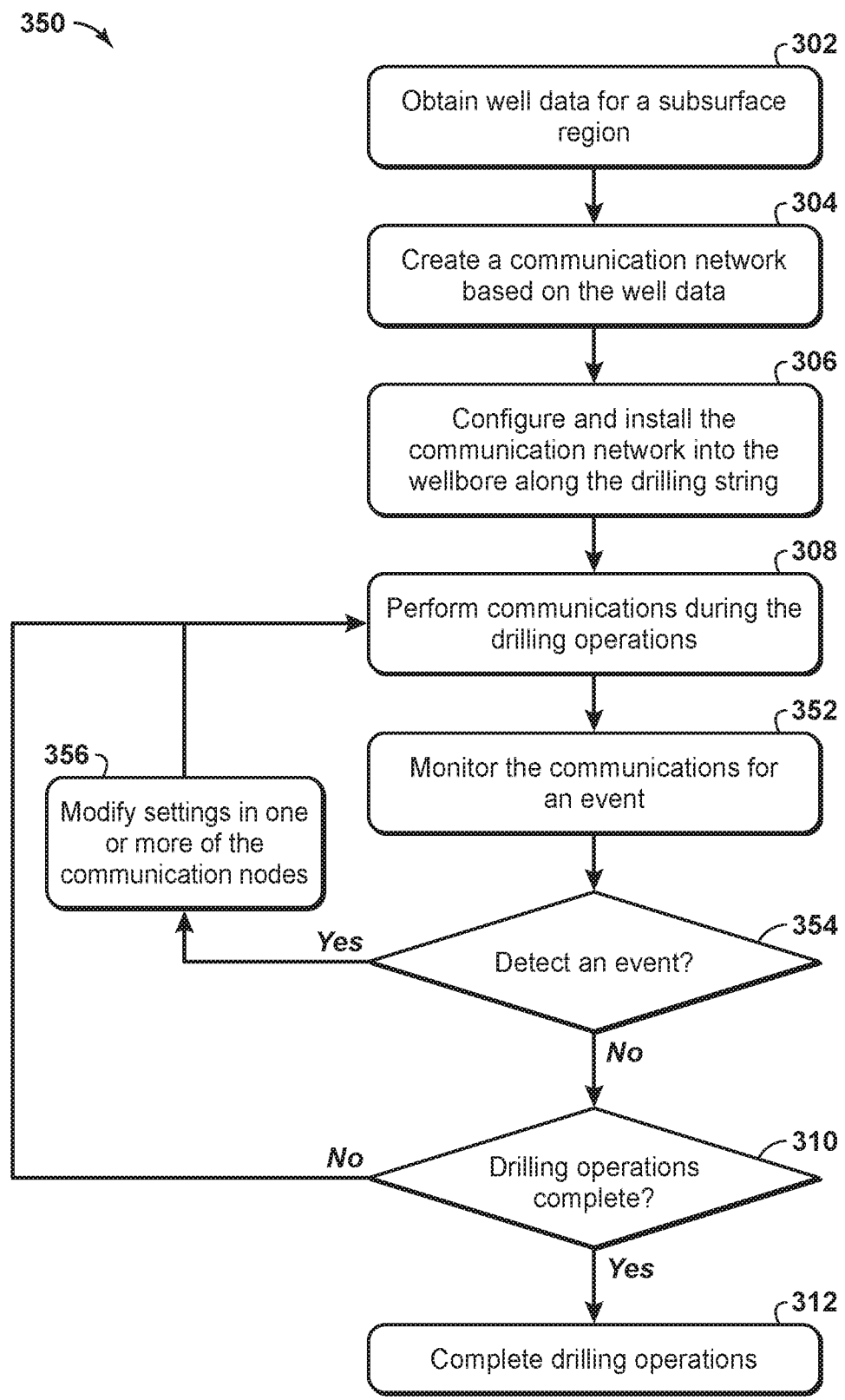

FIGS. 3A and 3B are exemplary flow charts 300 and 350 in accordance with embodiments of the present techniques. In FIG. 3A, the flow chart 300 is a method for creating, installing and using a wireless communication network for a wellbore, which is utilized during drilling operations. The method may include creating a communication network and installing the communication network in a wellbore, as shown in blocks 302 to 306. Then, the communication network may be utilized during drilling operations, as shown in blocks 308 to 312.

To begin, the method involves creating, configuring and installing a wireless communication network for a wellbore, as shown in blocks 302 to 306. At block 302, well data for a subsurface region is obtained. The well data may include seismic data, vibration data, acoustic data, electromagnetic data, resistivity data, gravity data, well log data, core sample data, and combinations thereof. In other configurations, the well data may include the dimensions and material composition of the tubular members (e.g., the drill strings), the material composition of the cement or fluids within the wellbore, length of the tubular members, length of the cement, fluids and/or other information associated with the equipment and/or configuration of the well. Further, the well data may also include temperature, pressures, strain and other similar properties. The well data may be obtained from memory or from the equipment in the wellbore. At block 304, a communication network is created based on the well data. The creation of the communication network may include selecting acoustic frequency bands; selecting individual frequencies; optimizing the acoustic communication band for each pair of communication nodes; determining coding method for the communication network and/or determining selective modes for the communication network. In addition, the creation of the communication network may include determining the noises and associated filters to be used for the communications, determining the directional mode settings for the communication nodes, and determining omnidirectional mode settings for the communication nodes. Further, the communication network may be configured to utilize different network types, such as a physical network and/or a wireless network. For example, a communication node may be configured to operate with different wireless network types, such as low frequency, high frequency and/or radio frequency. Each of these different network types may be used to exchange data packets or signals between different communication nodes, which may directional communication to enhance the hydrocarbon operations. The creation of the communication network may include performing a simulation with a configuration of communication nodes, which may include modeling specific frequencies and/or use of certain type of communication node within specific zones or segments of the wellbore. The simulation may include modeling the drilling strings, the communication of signals between communication nodes and/or other aspects, which may indicate the preferred frequency bands and preferred transmission modes. The simulation results may include the computation of time-varying fluid pressure and fluid compositions and the prediction of signal travel times within the wellbore. Performing the simulation may also include modeling fluid, modeling signal transmissions and/or structural changes based on the communication network. Then, the communication network is configured and installed into the wellbore, as shown in block 306. The configuration of the communication network may include configuring the communication nodes to utilize specific transmission modes, such as directional mode and/or omnidirectional mode, to enhance the exchange of data, such as operational data within the wellbore. The installation of the communication network may include disposing the communication nodes within the wellbore, which may be secured to tubular members.

Then, the communication network may be utilized for drilling operations, as shown in blocks 308 to 312. At block 308, the communication network is used to perform communications during the drilling operations. The communication network may be used during the drilling operations, which may be performed concurrently or simultaneously with the drilling operations. The drilling operations may include drilling an exploratory well, a production well, an injection well and/or any combination thereof. For example, the communication network may be used to monitor the bottomhole assembly and to adjust the bottomhole assembly, and/or the direction of the drill bit. Further, the communications may include exchanging information about the drill bit, associated formation and/or other drilling equipment (e.g., drilling motors, drill string, and/or other equipment in the bottomhole assembly.

Then, at block 310, a determination is made whether the drilling operations are complete. If the drilling operations are not complete, the communication network is used to continue to perform communications during the drilling operations, as shown in block 308. If the drilling operations are complete, the drilling operations may be completed, as shown in block 312. The completion of the drilling operations may involve shutting down drilling operations, removing the drilling string from wellbore, and/or performing hydrocarbon operations. The hydrocarbon operations may include hydrocarbon exploration operations, hydrocarbon development operations, and/or hydrocarbon production operations. For example, the communication network may be used to install or modify a well.

In FIG. 3B, the flow chart 350 is a method may include various adjustments to detect downhole events, which may be used with the blocks in FIG. 3A. For example, the creation and installation of the communication network may be performed as in a similar manner to blocks 302 to 306, and the communication network may be used as noted in blocks 308 to 312 of FIG. 3A. However, in this flow chart 350, the monitoring for an event and the adjustments are shown in blocks 352 to 356.

The creation and installation of the communication network may be performed as in a similar manner to blocks 302 to 306. Then, the communication network may be monitored and communication nodes may be adjusted, as shown in blocks 352 to 356. At block 352, the communication network is monitored for an event. An event may be a communication failure, such as when the network fails to operate properly, which may be detected by as a local failure; detection of errors in the operational data (e.g., larger number of errors as compared to an error setting); a change in the acoustic environment; a manual trigger and/or a time based period has been reached. The monitoring of the communication network may involve determining if the communication errors exceed a threshold in exchanges between communication nodes, which may include receiving or detecting a string of communications between communication nodes. With redundant communication nodes deployed, if one communication node stops working or the change of acoustic environment prevents successful communication, self-healing mechanism can be utilized to communicate to the next neighbor. At block 354, a determination is made whether an event has been detected. The determination may include determining whether a notification has been indicated or detecting a communication failure. If an event has been detected, the settings may be modified in one or more of the communication nodes, as shown by block 356. The modification of the settings may include adjusting the selected acoustic frequency bands; adjusting the selected individual frequencies; optimizing the acoustic communication band for each pair of communication nodes; determining a different coding method for the communication nodes in the communication network; determining selective modes for the communication network and/or determining a modification in the directional setting for the communication nodes. The modification of the directional settings may include adjusting the configuration of one or more communication nodes in the communication network to select another mode for transmission of the signals, such as changing from omnidirectional odes to directional modes. If an event is not detected, a determination may be made whether the drilling operations are complete and the drilling operations may be completed, as shown in blocks 310 and 312.

Beneficially, the method provides enhancements in the drilling operations, which may be used to access subsurface resources, such as hydrocarbons. In particular, the method may be utilized to enhance communication within the wellbore during the drilling operations. As a result, the present techniques provide a mechanism for communication without stopping the drilling operations. The high frequency telemetry may also provide communication during horizontal drilling, which is not performed using conventional methods, such as mud pulsing. In addition, the present techniques provide specific configurations that may optimize communication through the use of directional communications. Specifically, the communication nodes may include adjusting the transmission modes between an omnidirectional mode and a directional mode. The changing of transmission modes may lessen the risk of unreachable communication nodes or a severed or isolated communication network due to emergence of an unworkable downhole communication event. As a result, the present techniques may lessen risks associated with production of hydrocarbons. Further, the acoustic communication nodes may be reused, which may lessen the restrictions or limitations on power and cost as compared to other configurations that involve well completion operations and production operations. Thus, the communication nodes may be configured to be more powerful, provide long-range communications and utilized for near real-time communication for the drilling system during drilling operations (e.g., drilling the well). Further still, the fluids within the drilling string and external to the drilling string may also be used to enhance communications. For example, the communication nodes may include ultrasonic transducers (configured as transmitters and receivers) configured in an array to operate in a T0 mode. T0 mode may be preferable for long-range guide-wave propagation along the drilling string wall or surfaces because it is non-dispersive (e.g., no spreading, no pulse contamination, and/or provides a high fidelity of zero-crossing signal) and involves minimal leakage loss to the surrounding fluids because T0 mode utilizes shear waves. Other than using the drilling sting as acoustic communication media, the drilling mud inside or outside of the drilling string may be used individually or in addition to the drilling string. The fluid communication may be used for longer communication distances. Also, the acoustic communication nodes may be reused so that the restriction on power and cost may be lessened as compared to permanent downhole applications associated with a well completion operations and production operations. Thus, the configuration may be more powerful, long-range and near real-time communication system for drilling.

As may be appreciated, the blocks of FIG. 3 may be omitted, repeated, performed in a different order, or augmented with additional steps not shown. Some steps may be performed sequentially, while others may be executed simultaneously or concurrently in parallel. For example, in certain embodiments, the transmission modes may be determined and the communication nodes may be configured to utilize different transmission modes. The determination of the transmission node may be based on the drilling operations being performed, such that the transmission mode (e.g., such as directional mode and/or omnidirectional mode) used by the communication node may be based on the drilling operations being performed. Also, in other configurations, the filters may be determined to lessen the background noise from drilling operations, which may then be installed into the communication nodes for use during drilling operations. Also, the method may include determining a filter for each of the drilling operations to be performed. Then, each of the communication nodes may be configured to adjust the filter in the respective communication nodes based on the drilling operations being performed. As a result, a specific filter may be used for the respective communication node based on the drilling operations being performed.

FIGS. 4A, 4B, 4C, 4D and 4E are exemplary diagrams 400, 420, 440, 480 and 490 of exemplary views of a communication node in accordance with embodiments of the present techniques. In the diagrams 400, 420, 440, 480 and 490, array configurations are shown for generating directional transmissions and/or omnidirectional transmissions of signals (e.g., acoustic wave) along tubular members, which may be a drill string, as an example. The transducer may be piezoelectric transducers or electro-magnetic acoustic transducers.

Figure 4A:
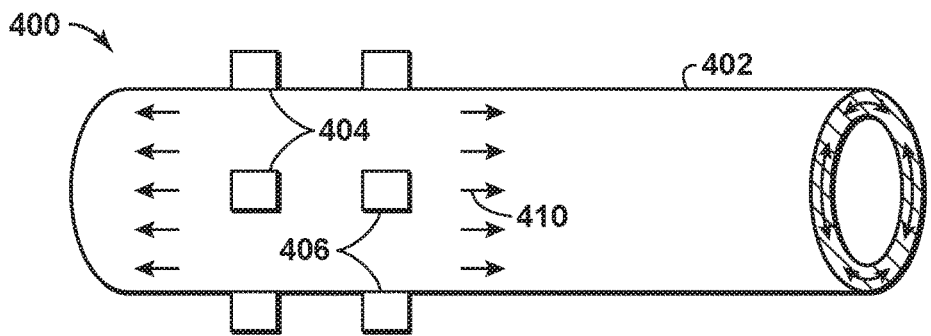
FIGS. 4A, 4B, 4C, 4D and 4E are exemplary diagrams of an exemplary view of a communication node in accordance with embodiments of the present techniques.

FIG. 4A is an exemplary diagram 400 of an array configuration that includes two rings of transducers disposed along a tubular member 402. Each of the transducers is configured to transmit signals in various directions, such as shown by arrows 410. To provide directional transmissions, one of the ring of transducers may transmit signals, while the other ring of transducers may transmit signals to lessen or cancel the signals propagating in the non-desired direction. For example, a first ring of transducers, which includes transducers 404, is used with a second ring of transducers, such as transducers 406. In this array configuration, the second ring of transducers may transmit signals and the first ring of transducers may transmit signals that lessen or counter the signals generated by the second ring of transducers. Accordingly, the resulting signals are shown by the arrows 410 that transmit in one primary direction. To provide omnidirectional transmissions, only one of the ring of transducers is utilized or both rings of transducers are utilized to compliment the signals generated from the respective transducers.

Figure 4B:
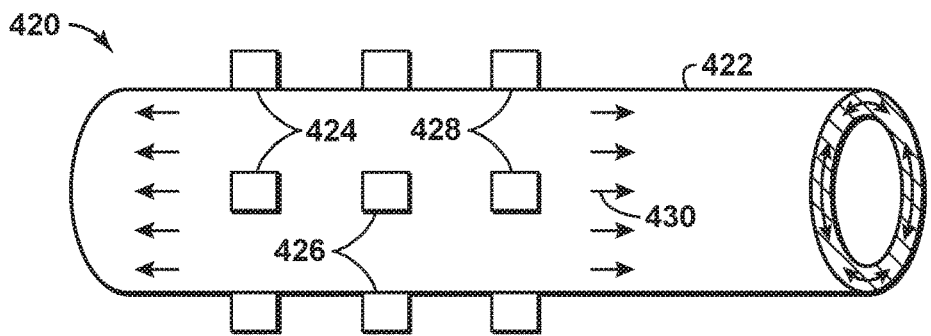

FIG. 4B is an exemplary diagram 420 of an array configuration that includes three rings of transducers disposed along a tubular member 422. Each of the transducers is configured to transmit signals in various directions, such as shown by arrows 430. In array configuration, a first ring of transducers, which includes transducers 424, is used with a second ring of transducers, which includes transducers 426, and a third ring of transducers, which includes transducers 428. To provide directional transmissions, one or more of the rings of transducers may transmit the signals and the remaining rings of transducers may transmit signals that lessen or counter the signals in the non-desired direction. For example, the third ring of transducers may transmit signals and the first ring of transducers and second ring of transducers may transmit signals that lessen or counter the signals generated by the third ring of transducers. Accordingly, the resulting signals are shown by the arrows 430 that transmit in one primary direction. To provide omnidirectional transmissions, only one of the ring of transducers is utilized or both, or all rings of transducers are utilized to compliment the signals generated from the respective transducers.

Figure 4C:
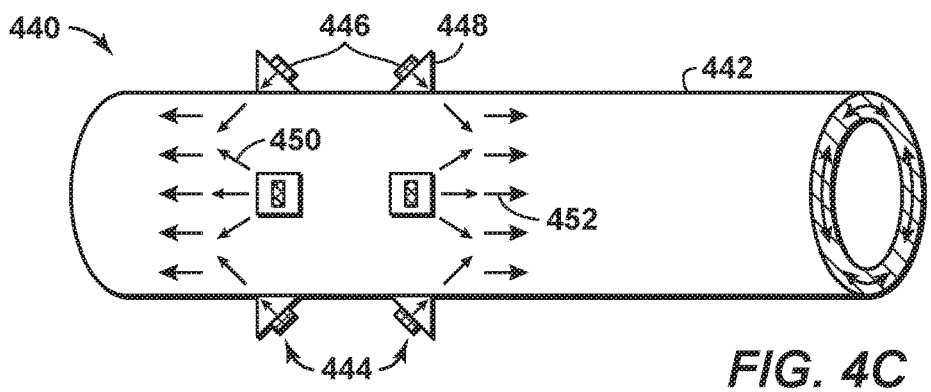

FIG. 4C is an exemplary diagram 440 of an array configuration that includes two rings of angle beam transducers 444 disposed along a tubular member 442. Each of the angle beam transducers 444 include a transducer 446 and angle beam adapter 448 that is configured to transmit signals along the direction shown by arrow 450. The resulting signals from the ring of angle beam transducers 444 may results in signals transmitted along the direction shown by arrows 452. In an exemplary configurations, each angle beam transducer 444 may include one or more transducer 446 and an angle beam adaptor 448, which is a wedge that provides a selected angle. By controlling each element width, spacing, acoustic frequency and bandwidth of excitation, and relative time delay of activation on each transducer, such as transducers 444, an omnidirectional acoustic wave may be generated along the tubular member 442. To generate bidirectional acoustic waves for communication along opposite directions, two rings of angle beam transducers 444 may be utilized and may include different angle bean adaptors.

Figure 4D:
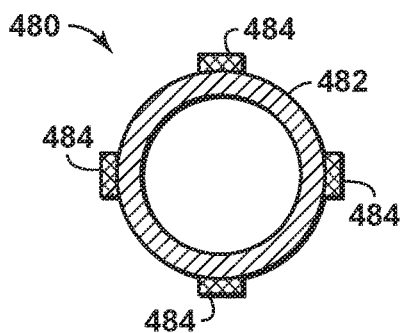

FIG. 4D is an exemplary diagram 480 of a cross sectional view along one of the rings of various transducers, such as transducers 404, 406, 424, 426, 428, 444 and 446. In this configuration, the transducers 484 includes four transducers disposed around a tubular member 482. Each of the transducers 484 is configured to transmit signals in various directions and may be spaced equidistance from each other around the circumference of the tubular member 482.

Figure 4E:
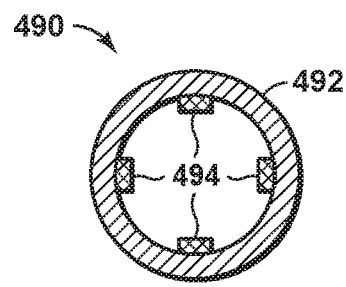

FIG. 4E is an exemplary diagram 490 of a cross sectional view along one of the rings of various transducers, such as transducers 404, 406, 424, 426, 428, 444 and 446. In this configuration, the transducers 494 includes four transducers disposed around the internal surface of a tubular member 492. Each of the transducers 494 is configured to transmit signals in various directions and may be spaced equidistance from each other around the circumference of the tubular member 492.

In yet other configurations, the physical implementation of the communication node may be one collar that wrap around the tubular member, all transducers and their electronic control circuits, and power batteries can be included in the collar for simplified communication among all transducers. The transducers may be used as signal transmitters or receivers, depending on their electronic circuit connections. Transducer types may be piezoelectric device or electro-magnetic acoustic transducer.

Figure 5:
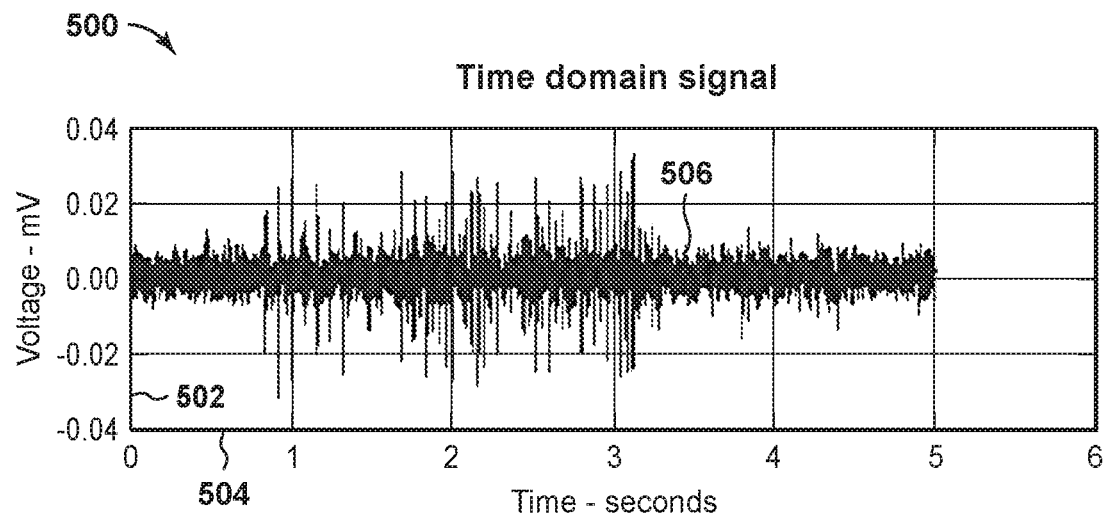
FIG. 5 is a diagram of an exemplary time domain signal.
Figure 6:
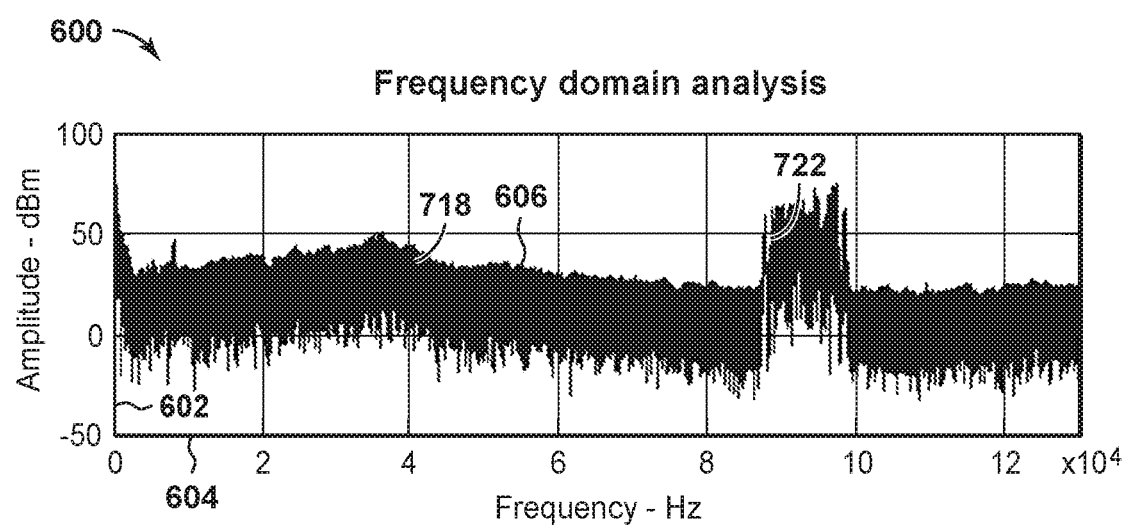
FIG. 6 is a diagram of an exemplary frequency domain analysis of time domain signal in FIG. 5.

By way of example, the direction communications is further described in FIGS. 5 and 6. For example, FIG. 5 is a diagram 500 of an exemplary time domain signal. In the diagram 500, an exemplary acoustic signal 506 that may be used during well drilling process is shown along a time axis 504 in seconds (s) and a voltage axis 502 in milli-voltage (mV). The acoustic signal 506 shows the signals representing the information (e.g., operational data) being communicated between the communication nodes (e.g., portions of the signal having voltage amplitude greater than 0.01 mV and less than 0.01 mV), while the drilling noises are the remaining portions of the acoustic signals 506 (e.g., in the range between −0.01 mV and 0.01 mV). Accordingly, the drilling noises may be separated from ultrasonic communication signals.

FIG. 6 is a diagram 600 of an exemplary frequency domain analysis of time domain signal from FIG. 5. In the diagram 600, an exemplary acoustic signal 606 that may be used during well drilling process is shown along a frequency axis 604 in hertz (Hz) and an amplitude axis 602 in decibel-milliwatts (dBm). The acoustic signal 606 shows the signals representing the information (e.g., operational data) being communicated between the communication nodes along with the associated drilling noises. Accordingly, the low frequencies of the drilling noises (e.g., less than (<) 50 kHz) may be separated from ultrasonic communication signals.

The present techniques include a configuration that may utilize communication nodes that are low-frequency communication nodes and/or high-frequency communication nodes. These different communication nodes may be utilized to provide enhancements to the operation of drilling operations. By way of example, the communication nodes may include using low frequency communication nodes for locations that do not involve sensing. The low-frequency communication nodes may involve a low-frequency, long range telemetry system that may be utilized for optimal performance with low system complexity. The high-frequency communication nodes may be used in locations that involve sensing (e.g., near the drill bit or the drilling equipment). The high-frequency communication nodes may involve a higher frequency as compared to a low frequency used by the low-frequency communication nodes.

In other configurations, the communication nodes may include other enhancements. For example, the communication nodes may be configured to utilize a different effective clock speeds (e.g., a low-frequency effective clock speed) to monitor for received signals and to wake the communication node from a sleep mode that utilizes the another effective clock speed (e.g., high-frequency effective clock speed); may be configured to communicate with low-frequency effective clock speeds to be able to communicate with other low-frequency devices, which may operate at frequencies above the noise; may be configured to provide redundant communications; may be configured to adjust or modify the alias frequency and/or may be configured to avoid downhole noise by utilizing aliasing with high pass filter.

In addition, other configurations may include processors that include different types of transducers, for example, piezoelectric components or magnetostrictive components, to generate the signals and/or to receive the signals. By way of example, the communication nodes may include piezoelectric transducers of different sizes. The encoding components may include smaller piezoelectric transducers that may be configured to transmit higher frequency signals (e.g., around their resonant frequency bands), which may also use less electrical power as compared to larger piezoelectric transducer or to transmit signals outside the resonant frequency bands of a given transducer. In addition, the smaller piezoelectric transducers may provide a mechanism to lessen the size of the structure for the communication nodes. Accordingly, the encoding component may be configured to transmit at higher frequencies, which utilizes less energy than the low-frequency transmissions. Thus, by using the high-frequencies for the transmissions in combination with the low-frequency clock speeds on the decoding component (e.g., receiver), the communication nodes may lessen energy usage.

In other configurations, aliased signals (e.g., aliased frequencies) may be used to enhance redundancy. In particular, the transmitted signals may be generated by at two or more frequencies, which correspond to the same aliased frequencies at the receiving end (e.g., receiving communication node). For example, if frequencies in a first band are unworkable in the downhole environment, the communication nodes may alternately transmit signals on a second band because both bands alias to the same aliased frequencies (e.g., the mapping is to a similar detectable frequency once normalized to a low-frequency clock). Accordingly, several alternate bands may be available based on the differences of the clock speeds. As a result, several aliased frequencies may be used to mitigate the risk of losing communication due to an unworkable band (e.g., downhole environment or wellbore conditions, such as caused by frequency selective fading). By way of example, several aliased frequencies may be used to communicate instructions to the bottomhole assembly to manage the operations.

In one or more configurations, filters may be used to further manage the exchange of data packets (e.g., operational data) between the communication nodes. The communication nodes may include filters configured remove production noises and/or noises from drilling operations, where typical low frequency exists (e.g. less than (<) about 10 kHz to about 15 kHz). By way of example, the communication nodes may include a high pass filter configured to pass certain frequencies. Preferably, the filter may be used to remove low-frequency signals. In a preferred configuration, one or more filters may be activated or deactivated in the communication node, which may be communicated adjusted based on signals communicated between the communication nodes. As such, the communication node may be configured to apply a filter to be applied to each received signal when the setting is enabled and to bypass the filter when the setting is disabled. The change in the status of the filtering may be based on a setting in the communication node or based on a notification that is received in a transmitted signal.

In one or more embodiment, the communication network may be a wireless communication network that includes different types of wireless communication types. The wireless communication networks may include high-frequency communication networks, which include high-frequency communication nodes, and/or low-frequency communication networks, which include low-frequency communication nodes. By way of example, the present techniques may include a configuration that utilizes different types of communication nodes (e.g., low-frequency communication nodes and/or high-frequency communication nodes) to form the communication network, which may include different types of networks. These different communication nodes may be distributed along one or more tubular members, which may be within a wellbore, along a pipeline, or along a subsea tubular member, to enhance operations. The communication nodes may include using low-frequency communication nodes at locations that do not involve sensing (e.g., in an uncompleted vertical section). The low-frequency communication nodes may involve a low-frequency ranges, which may be utilized for optimal performance with low system complexity. The high-frequency communication nodes may be used for locations that involve sensing (e.g., near completions or zones of interest). The high-frequency communication nodes may involve a higher frequencies as compared to a low-frequencies used by the low-frequency communication nodes.

As a further example, the communication network may include low-frequency communication nodes; high-frequency communication nodes; communication nodes configured to communicate with high-frequencies and low-frequencies signals and communication nodes that are configured to communicate with low and/or high frequency radio frequencies (RF). The low-frequency communication nodes may be configured to transmit signals and to receive signals that are less than or equal to ($\leq$) 200 kHz, $\leq$100 kHz, $\leq$50 kHz, or $\leq$20 kHz. In particular, the low-frequency communication nodes may be configured to exchange signals in the range between 100 Hz and 20 kHz; in the range between 1 kHz and 20 kHz; and in the range between 5 kHz and 20 kHz. Other configurations may include low-frequency communication nodes, which may be configured to exchange signals in the range between 100 Hz and 200 kHz; in the range between 100 Hz and 100 kHz; in the range between 1 kHz and 200 kHz; in the range between 1 kHz and 100 kHz; in the range between 5 kHz and 100 kHz and in the range between 5 kHz and 200 kHz. The communication nodes may also include high-frequency communication nodes configured to transmit and receive signals that are greater than (>) 20 kHz, >50 kHz, >100 kHz or >200 kHz. Also, the high-frequency communication nodes may be configured to exchange signals in the range between greater than 20 kHz and 1 MHz, in the range between greater than 20 kHz and 750 kHz, in the range between greater than 20 kHz and 500 kHz. Other configurations may include high-frequency communication nodes, which may be configured to exchange signals in the range between greater than 100 kHz and 1 MHz; in the range between greater than 200 kHz and 1 MHz; in the range between greater than 100 kHz and 750 kHz; in the range between greater than 200 kHz and 750 kHz; in the range between greater than 100 kHz and 500 kHz; and in the range between greater than 200 kHz and 500 kHz.

In one or more configurations, the communication network may include a physical connection network. The physical connections may include one or more cables, one or more electrical conductors and/or one or more fiber optic cables, which may be secured to a tubular member and used to evaluate subsurface conditions. The physical connection may be secured to an inner portion of the tubular member and/or an outer portion of the tubular member. The physical connection provides a hard wire connection that may provide concurrent or real-time exchange of data packets within the wellbore. In addition, the physical connection may be used to provide power directly to communication nodes and/or downhole sensors. By way of example, the physical connections may be within an array or ring of transducers, which are configured to wireless communicate with other transducers not associated with the array or ring.

In other configurations, as physical cables may be difficult to deploy along tubular members in certain environments (e.g., a wellbore), the communication network may include a combination of one or more wireless networks with one or more physical connection networks. In such a configuration, the physical connection network of communication nodes may be disposed at locations that do not involve sensing (e.g., along certain sections of the drill string), while the wireless network of communication nodes may be disposed at locations in horizontal sections of the wellbore or sections that involve sensing (e.g., certain sections or specific locations along the drilling string or the bottomhole assembly, which may be near the drill bit). Another configuration may include using wireless network of communication nodes for long range communications, while the wired physical connections network of communication nodes may be used for monitored sections of the wellbore to handle the high speed data transmissions within those sections. By way of example, the communication network may be a mixed network that is configured to have shorter wired sections or wired communication nodes along certain portions of the drilling string. The wireless section of the drilling strings may be near the joints (e.g., at the top or bottom of a section of drilling strings) to minimize the risk of wire breakage from spinning the drilling string.

In yet another configuration, the decoding or detecting modes may utilize windowing, a sliding window, data smoothing, statistical averaging, trend detection, polyhistogram and the like. The detecting mode may also be combined with simple redundancy of various forms of spread spectrum communications, such as spectrum-constrained application. Also, the decoding modes may be combined with one or more layers of forward error correction (FEC). By way of example, the decoding modes may include Fast Fourier Transform (FFT) detection and/or zero crossing detection (ZCX), which decode via frequency domain and time domain, respectively. The tones may be defined as decoded or detected if FFT recognizes the correct frequencies or ZCX recognizes the correct periods. The FFT and/or ZCX may be selected depending on computational power and energy efficiency of the microcontroller deployed in the communication node. For FFT, tone selection may be based on the relative magnitude of each tone. FFT may involve greater computational power, but is more able to handle background noise. For ZCX, tone selection may be based on normalized period of zero crossings of each tone. ZCX may involve less computational power, but may be vulnerable to misdetections due to background noise. Also, FFT may resolve amplitude dependent signals, while ZCX involves low power devices and/or low received signal levels.

In other configurations, other devices (not shown) may be used within the wellbore to communicate with the communication nodes. The other devices may include other tools, which may be disposed inside the wellbore along the drilling string. The other tools may be utilized to exchange data (e.g., operational data) with communication nodes, which may be associated with the bottomhole assembly or other drilling equipment along the drilling string. The other devices may be configured to receive signals at frequencies less than 15 kHz. These low-frequency devices may be disposed within different portions of the drilling string or may be associated with specific equipment within the wellbore.

Persons skilled in the technical field will readily recognize that in practical applications of the disclosed methodology, it is partially performed on a computer, typically a suitably programmed digital computer or processor based device. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the present techniques also relate to an apparatus for performing the operations herein. This apparatus, such as the control unit or the communication nodes, may be specially constructed for the required purposes, or it may comprise a general-purpose computer or processor based device selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present techniques are in no way limited to implementation in any specific operating system or environment.

The hydrocarbon operations, such as drilling operations, may include utilizing the communication nodes and a control unit. The communication network may include performing serial networking; may include performing parallel processes in different zones along the tubular members; may include one or more radio networks (e.g., at the topside, which may be below grade); may include one or more hydrophone networks, may include wired networks, which may be wired to a specific depth or within specific regions along the tubular members. The communication nodes may be configured to operate autonomously based on predefined or built-in rules, or implicitly by other communication nodes conveying instructions and may even adjust the instructions during operations.

By way of example, the control unit may include a computer system that may be used to perform any of the methods disclosed herein. A central processing unit (CPU) is coupled to system bus. The CPU may be any general-purpose CPU, although other types of architectures of CPU (or other components of exemplary system) may be used as long as CPU (and other components of system) supports the inventive operations as described herein. The CPU may execute the various logical instructions according to disclosed aspects and methodologies. For example, the CPU may execute machine-level instructions for performing processing according to aspects and methodologies disclosed herein.

The computer system may also include computer components such as a random access memory (RAM), which may be SRAM, DRAM, SDRAM, or the like. The computer system may also include read-only memory (ROM), which may be PROM, EPROM, EEPROM, NOR flash, NAND flash or the like. RAM and ROM hold user and system data and programs, as is known in the art. The computer system may also include an input/output (I/O) adapter, a graphical processing unit (GPU), a communications adapter, a user interface adapter, and a display adapter. The I/O adapter, the user interface adapter, and/or communications adapter may, in certain aspects and techniques, enable a user to interact with computer system to input information.

The I/O adapter preferably connects a storage device(s), such as one or more of hard drive, compact disc (CD) drive, floppy disk drive, tape drive, etc. to computer system. The storage device(s) may be used when RAM is insufficient for the memory requirements associated with storing data for operations of embodiments of the present techniques. The data storage of the computer system may be used for storing information and/or other data used or generated as disclosed herein. The communications adapter may couple the computer system to a network (not shown), which may include the communication network for the wellbore and a separate network to communicate with remote locations), which may enable information to be input to and/or output from system via the network (for example, a wide-area network, a local-area network, a wireless network, any combination of the foregoing). User interface adapter couples user input devices, such as a keyboard, a pointing device, and the like, to computer system. The display adapter is driven by the CPU to control, through a display driver, the display on a display device.

The architecture of system may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such that a set of instructions or code that, when executed, performs the instructions or operations from memory. By way of example, the communication nodes may include a processor; an encoding component, decoding component and memory. The decoding component is in communication with the processor and is configured to receive operational data associated with drilling operations. The memory is in communication with the processor and the memory has a set of instructions, wherein the set of instructions, when executed, are configured to perform the method steps or configurations, as noted above.

In certain configurations, the present techniques utilize the periodic relationship between aliased frequencies and signal frequencies to decode signal information. By limiting the communication frequency band to have the aliasing resulting in a one-to-one relationship between an ultrasonic frequency and an aliased frequency, each aliased frequency determines exactly one ultrasonic frequency. For example, for a first band, the communication node may be configured to decode signal information using a processor operating at a low-frequency effective clock speed, which uses less power as compared to a processor operating at a high-frequency effective clock speed. In particular, a processor may operate at an effective clock speed of 32.768 kHz, which may correspond to a receiver that draws a current of 1 milliamps (mA), while a processor may operate at an effective clock speed of 48 MHz, which may correspond to a receiver that draws current of 15 mA. As such, the processor operating at the low-frequency effective clock speed may significantly lessen the energy used as compared to the processor operating at the high-frequency effective clock speed.

In certain configurations, the present techniques involves various relationships to manage the frequency aliasing within communication network. By way of example, the ratio of the low-frequency effective clock speed to the high-frequency effective clock speed may be greater than 1:2; may be greater than 1:4; may be greater than 1:10; in a range between 1:2 and 1:1,000; in a range between 1:4 and 1:100 and/or in a range between 1:10 and 1:80. In other configurations, the Nyquist frequency is associated with the receiving communication node and is based on the effective clock speed in force at the receiving communication node. For example, the transmitted signal frequency may be greater than the Nyquist frequency; may be greater than two times the Nyquist frequency; may be greater than three times the Nyquist frequency; or the transmitted signal frequency may be greater than four times the Nyquist frequency. The ratio of the Nyquist frequency to the transmitted signal frequency may be in the range between 1:2 and 1:1,000; may be in a range between 1:2 and 1:100 and/or may be in a range between 1:2 and 1:10. As another example, the transmitted signal, which may be at a frequency higher than the sampling frequency, may be decoded to provide the information for decoding the remainder of the packet.

In one configuration, the communication nodes may be configured to transmit at a high-frequency effective clock speed and may be configured to receive at a low-frequency effective clock speed. In such a configuration, the communication nodes may utilize higher energy in transmitting the data packets and may utilize lower energy in receiving the data packets (e.g., operational data). By way of example, the communication nodes may include one or more processors operating at an effective clock speed of about 48 MHz for transmission of data packets on the communication network and one or more processors operating at an effective clock speed of about 32.768 kHz for reception of data packets. The low-frequency effective clock speeds may include 32 kHz, 32.768 kHz, 38 kHz, 77.500 kHz, 100 kHz, 120 kHz, and 131.072 kHz; and the high-frequency effective clock speeds may include 500 kHz, 1 MHz, 2 MHz, 8 MHz, 32 MHz, 48 MHz and 80 MHz.

In addition, other configurations may include processors that include different types of transducers, for example, piezoelectric components or magnetostrictive components, to generate the signals and/or to receive the signals. By way of example, the communication nodes may include piezoelectric transducers of different sizes. The encoding components may include smaller piezoelectric transducers that may be configured to transmit higher frequency signals (e.g., around their resonant frequency bands), which use less electrical power as compared to larger piezoelectric transducer or to transmit signals outside the resonant frequency bands of a given transducer. In addition, the smaller piezoelectric transducers may provide a mechanism to lessen the size of the structure for the communication nodes. Accordingly, the encoding component may be configured to transmit at higher frequencies, which utilizes less energy than the low-frequency transmissions. Thus, by using the high-frequencies for the transmissions in combination with the low-frequency effective clock speeds on the decoding component (e.g., receiver), the communication nodes may lessen energy usage.

In other configurations, the aliased signals (e.g., aliased frequencies) may be used to enhance redundancy. In particular, the transmitted signals may be generated by at two or more frequencies, which correspond to the same aliased frequencies at the receiving end (e.g., receiving communication node). For example, if frequencies in a first band are unworkable in the downhole environment, the communication nodes may alternately transmit signals on a second band because both bands alias to the same aliased frequencies (e.g., the mapping is to a similar detectable frequency once normalized to a low-frequency effective clock speed). Accordingly, several alternate bands may be available based on the differences of the effective clock speeds. As a result, several aliased frequencies may be used to mitigate the risk of losing communication due to an unworkable band (e.g., downhole environment or wellbore conditions, such as caused by frequency selective fading). Certain configurations may utilize the aliased frequencies to signal the communication node, which may be to perform a specific operation or to transmit data packets (e.g., operational data). By way of example, communication nodes may be configured to use a combination of one or more aliased frequencies as a signal to place the communication node into an operational mode in the respective communication node. In particular, a communication node may use a sequence of one or more aliased frequencies as a signal to change the mode in the communication node.

In yet another configuration, the communication nodes may be configured to operate with low-frequency signals and/or high-frequency signals, which may be used to communication with the communication nodes. The low-frequency device may be utilized to exchange data or instructions to the communication nodes. This configuration may be used to reach or communicate with communication nodes that may provide longer range communications than conventionally utilized within the wellbore. As a specific example, the communication nodes may be configured to receive communication signals from a communication device, such as a hydrophone or a designated communication node, transmitting in a lower frequency band (e.g., to provide longer range communications) without involving reconfiguration of any network devices, such as the communication nodes. In particular, the downhole network may be configured to receive and/or to transmit frequencies less than 200 kHz or less than 150 kHz, but greater than the drilling noises, which are less than 50 kHz. The use of the lower frequencies extends the distance that the lower-frequency communication nodes may be spaced apart from each other and maintain the exchange of data packets. As a specific example, certain communication nodes may be configured to receive signals at frequencies less than 200 kHz. These low-frequency communication nodes may be disposed within different zones of the wellbore, which may be utilized within the respective zones to lessen the risk of becoming separated or losing a portion of the downhole network. The communication nodes that operate at these lower frequencies may be configured to receive longer range signals as compared with communication nodes operating at higher frequencies. As a result, the lower-frequency communication nodes may be reachable, while the higher-frequency communication nodes may not be able to communicate in certain portions of the drilling string.

In one or more configurations, filters may be used to further manage the exchange of data packets (e.g., operational data) between the communication nodes. The communication nodes may include filters configured remove drilling noises and/or other background noises, where typical low frequency exists (e.g. less than about 10 kHz, less than about 15 kHz, less than about 50 kHz or about 65 kHz). By way of example, the communication nodes may include a high pass filter configured to pass certain frequencies. Preferably, the filter may be used to remove low-frequency signals. In a preferred configuration, one or more filters may be activated or deactivated in the communication node, which may be communicated adjusted based on signals communicated between the communication nodes and may be based on drilling operations being performed. As such, the communication node may be configured to apply a filter to be applied to each received signal when the setting is enabled and to bypass the filter when the setting is disabled. The change in the status of the filtering may be based on a setting in the communication node or based on a notification that is received in a transmitted signal.

In still yet another configuration, the high-frequency effective clock speed of the communication node may be used with the low-frequency effective clock speed in the same communication node, which may be utilized together to verify signals exchanged between the communication nodes. For example, the communication node may receive a signal and decode the signal with the high-frequency effective clock speed and the low-frequency effective clock speed. Then, the communication node may be configured to compare the decoded information with the different effective clock speeds to determine if the signal is accurate and/or decoded information with the different effective clock speeds to obtain the information indicated or decoding using low frequency effective clock speed first as initial screening to decide to use high frequency effective clock speed or not, if needed, high frequency effective clock speed is used, this way could save energy by avoid using high frequency effective clock speed as much as possible.

As a further example, the communication network may include low-frequency communication nodes; high-frequency communication nodes; communication nodes configured to communicate with high-frequencies and low-frequencies signals and communication nodes that are configured to communicate with low and/or high frequency radio frequencies (RF). The low-frequency communication nodes may be configured to transmit signals and to receive signals that are less than or equal to ($\leq$) 200 kHz, $\leq$175 kHz, or $\leq$150 kHz. In particular, the low-frequency communication nodes may be configured to exchange signals in the range between 100 Hz and 200 kHz. Other configurations may include low-frequency communication nodes, which may be configured to exchange signals in the range between 100 Hz and 200 kHz; or in the range between 100 Hz and 150 kHz. The communication nodes may also include high-frequency communication nodes configured to transmit and receive signals that are greater than (>) 200 kHz, >500 kHz, or >750 kHz. Also, the high-frequency communication nodes may be configured to exchange signals in the range between greater than 200 kHz and 1 MHz, in the range between greater than 200 kHz and 750 kHz, in the range between greater than 200 kHz and 500 kHz.

In yet another configuration, the aliasing may utilize different decoding modes. The decoding or detecting modes may utilize windowing, a sliding window, data smoothing, statistical averaging, trend detection, polyhistogram and the like. The detecting mode may also be combined with simple redundancy of various forms of spread spectrum communications, such as spectrum-constrained application. Also, the decoding modes may be combined with one or more layers of forward error correction (FEC). By way of example, the decoding modes may include Fast Fourier Transform (FFT) detection and/or zero crossing detection (ZCX), which decode via frequency domain and time domain, respectively. The tones may be defined as decoded or detected if FFT recognizes the correct frequencies or ZCX recognizes the correct periods. The FFT and/or ZCX may be selected depending on computational power and energy efficiency of the microcontroller deployed in the communication node. For FFT, tone selection may be based on the relative magnitude of each tone. FFT may involve greater computational power, but is more able to handle background noise. For ZCX, tone selection may be based on normalized period of zero crossings of each tone. ZCX may involve less computational power, but may be vulnerable to misdetections due to background noise. Also, FFT may resolve amplitude dependent signals, while ZCX involves low power devices and/or low received signal levels.

In yet other configurations, the present techniques may address problems with gas kicks. Gas kicks pose great risk to the efficient operation of the drilling rig. It happens when well bore hydrostatic pressure is lower than formation pressure. These situations usually occur when the drilling goes into a formation that has pressure higher the expected pressure. It is also possible that the wellbore hydrostatic pressure is decreased due to tripping of the drill string. Current normal practice for kick detection is to monitor drilling mud balance in the well. The volumes of the mud flow-in and flow-out of the well are measured by paddle flow meter, which is not accurate and very slow. Meanwhile, downhole wireless networks can integrate multiple sensors for monitoring purposes. These data can also be transmitted back to surface in real time for monitoring and decision making.

For a system configuration, the downhole communication nodes may be installed inside and/or outside of the drill pipe. The spacing of the communication nodes may depend on the communication range and the monitoring resolution requirement. To monitor kick in the early stage, it is reasonable to include, but not limited to the following sensors: pressure, capacitance, conductivity, temperature, flow rate, density, and any combination thereof. The pressure sensor may be used to monitor the pressure change at the sensor location. Multiple pressure sensors on the drill string can be checked with each other and determine the differential pressure variation. With existence of gas, the electric properties of the flow may be changed accordingly, which can be represented by capacitance and conductivity measurement. These measurement can also be interpreted and provide the gas volume fraction. The capacitance and/or conductivity sensor array along the drill string may provide the gas and liquid velocities based on the cross correlation method. The combination of gas volume fraction and flow velocity comes with flow rate. The flow rate can also be measured by dedicated flow meter.

In addition, the communication nodes may be used to provide kick detection during drilling and tripping. When a kick occurs during drilling or tripping, the well bore pressure drops and gas bubbles come into the wellbore and rise in the well. These physical changes may be captured the distributed sensors installed on the drill string. These monitored data may be transmitted back to the topside for surveillance. These initially localized changes may be pin pointed based on the identification of communication nodes installed on the drill string. In this example, the kick may provide early detected and the drillers can act sooner to mitigate the risks.

When a kick already occurs and certain mitigation processes have been carried out, such as reducing the tripping speed, increasing mud density, and the like. The performance of these mitigation processes may be monitored in real time and the process can be tuned in real time to further improve the mitigation performance.

In addition, the system may provide mitigation advisory functionality. By way of example, the system may also be trained and be able to provide mitigation process recommendation. When no kick occurs, the downhole communication nodes may collect drilling information, including pressure at different depths, pressure change over time with different drilling speed and tripping speed. The correlations between pressure variation with depth, drilling speed and tripping speed are the baseline for mitigation recommendation. When wellbore pressure drops to certain threshold, the system can send alerts to the control unit and provide notifications for recommended drilling and/or tripping speed to regain the pressure control. Besides drilling and/or tripping speeds, the system may also provide drilling mud density adjustment to maintain the pressure if speeds are not the sufficient methods. The advisory system provides drillers more time for mitigation actions and avoids onsite hand calculations under high stress.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method of communicating data among a plurality of communication nodes along one or more drilling strings, the method comprising:
creating a communication network, wherein the communication network comprises a plurality of communication nodes, wherein each of the plurality of communication nodes are configured to transmit signals at frequencies greater than 50 kilohertz between two or more of the plurality of communication nodes in an omnidirectional mode or a directional mode along one or more drilling strings while concurrently performing drilling operations;
disposing the plurality of communication nodes along the one or more drilling strings;
communicating operational data between two or more of the plurality of communication nodes in an omnidirectional mode or a directional mode during drilling operations;
wherein each of the plurality of communication nodes comprise a first ring of transducers and a second ring of transducers, wherein in the directional mode each of the plurality of communication nodes transmits a signal with the first ring of transducers and dampens the transmitted signal with a signal generated by the second ring of transducers; and
performing drilling operations based on the operational data.

2. The method of claim 1, further comprising monitoring temperature near the drill bit; and
wherein the communicating operational data between two or more of the plurality of communication nodes during drilling operations further comprises transmitting the monitored temperature data to a control unit.

3. The method of claim 1, wherein transmitting signals between two or more of the plurality of communication nodes is accomplished using one or more transducers in each of the plurality of communication nodes.

4. The method of claim 1, further comprising monitoring vibration near the drill bit; and
wherein the communicating operational data between two or more of the plurality of communication nodes during drilling operations further comprises transmitting the monitored vibrational data to a control unit.

5. The method of claim 1, further comprising:
disposing each of the transducers within a separate housing such that each of the transducers communicates with a primary communication node controller to manage the transmission of signals.

6. The method of claim 1, further comprising configuring each of the plurality of communication nodes as a collar that is disposed around one of the one or more drilling strings.

7. The method of claim 1, further comprising circumferentially spacing apart the transducers about a perimeter of one of the one or more drilling strings.

8. The method of claim 1, further comprising equidistantly spacing apart the transducers about a perimeter of one of the one or more drilling strings.

9. The method of claim 1, wherein the communicating operational data between two or more of the plurality of communication nodes during drilling operations comprises communicating at frequencies greater than 200 kilo hertz.

10. The method of claim 1, wherein each of the plurality of communication nodes generates dominantly symmetric shear wave mode (T0).

11. The method of claim 1, wherein each of the plurality of communication nodes generates a dominantly torsional wave mode or a longitudinal wave mode.

12. The method of claim 1, wherein the communicating operational data between the two or more of the plurality of communication nodes comprises:
receiving one or more signals in one of the plurality of communication nodes; and
filtering the one or more signals using a high pass filter to lessen background noise from the one or more signals in the one of the plurality of communication nodes.

13. The method of claim 1, further comprising:
   i) monitoring the communication network for an event;
   ii) modifying one or more of the plurality of communication nodes to the directional mode if an event is detected; and
   iii) continuing communicating between the two or more of the plurality of communication nodes if an event is not detected; and
   iv) repeating steps i) to iii) until the hydrocarbon operations are complete.

14. The method of claim 1, further comprising disposing the plurality of communication nodes and the one or more drilling strings within a wellbore.

15. The method of claim 1, wherein communicating operational data between two or more of the plurality of communication nodes during drilling operations further comprises transmitting the operational data through a portion of the drilling string between two or more of the plurality of communication nodes.

16. The method of claim 1, wherein communicating operational data between two or more of the plurality of communication nodes during drilling operations further comprises transmitting the operational data through a portion of the fluid adjacent to the drilling string between two or more of the plurality of communication nodes.

17. The method of claim 1, further comprising monitoring wear on the drill bit; and
   wherein the communicating operational data between two or more of the plurality of communication nodes during drilling operations further comprises transmitting the monitored wear data to a control unit.

18. The method of claim 1, further comprising monitoring position of the drill bit; and
   wherein the communicating operational data between two or more of the plurality of communication nodes during drilling operations further comprises transmitting the monitored position data to a control unit.

19. A system for communicating along one or more drilling strings comprising:
   one or more drilling strings;
   a bottomhole assembly coupled to the drilling string; and
   a communication network coupled to the one or more drilling strings, wherein the communication network comprises a plurality of communication nodes, wherein each of the plurality of communication nodes are configured to communicate, at frequencies greater than 50 kilohertz, operational data between two or more of the plurality of communication nodes during drilling operations, wherein each of the plurality of communication nodes are configured to communicate the operational data in a omnidirectional mode or a directional mode based on a transmission setting, wherein each of the plurality of communication nodes comprise a first ring of transducers and a second ring of transducers, and wherein in the directional mode each of the plurality of communication nodes transmits a signal with the first ring of transducers and dampens the transmitted signal with a signal generated by the second ring of transducers.

20. The system of claim 19, wherein one or more of the plurality of communication nodes are configured to:
   monitor position of the drill bit; and
   transmit the monitored position data to a control unit.

21. The system of claim 19, wherein one or more of the plurality of communication nodes are configured to:
   monitor wear on the drill bit; and
   transmit the monitored wear data to a control unit.

22. The system of claim 19, wherein each of the plurality of communication nodes are configured to transmit the operational data through a portion of the fluid adjacent to the drilling string between two or more of the plurality of communication nodes.

23. The system of claim 19, wherein each of the plurality of communication nodes are configured to transmit the operational data through a portion of the drilling string between two or more of the plurality of communication nodes.

24. The system of claim 19, wherein one or more of the plurality of communication nodes are configured to: communicate at frequencies greater than 200 kilo hertz.

25. The system of claim 19, wherein one or more of the plurality of communication nodes are configured to:
   monitor vibration near the drill bit; and
   transmit the monitored vibration data to a control unit.

26. The system of claim 19, wherein each of the transducers is disposed within a separate housing and communicates with a primary communication node controller to manage the transmission of signals.

27. The system of claim 19, wherein each of the plurality of communication nodes is configured as a collar that is disposed around one of the one or more drilling strings and comprise transducers.

28. The system of claim 19, wherein the transducers are circumferentially spaced apart about a perimeter of one of the one or more drilling strings.

29. The system of claim 19, wherein the transducers are equidistantly spaced apart about a perimeter of one of the one or more drilling strings.

30. The system of claim 19, wherein one or more of the plurality of communication nodes are configured to:
   monitor temperature near the drill bit; and
   transmit the monitored temperature data to a control unit.

31. The system of claim 19, wherein each of the plurality of communication nodes generates dominantly symmetric shear wave mode (T0).

32. The system of claim 19, wherein each of the plurality of communication nodes generates dominantly torsional wave mode or longitudinal wave mode.

33. The system of claim 19, wherein each of the plurality of communication nodes is configured to:
   receive one or more signals; and
   determine whether the one or more signals indicate that the communication node is to enter the directional mode.

34. The system of claim 19, wherein each of the plurality of communication nodes are further configured to:
   receive one or more signals; and
   filter the one or more signals using a high pass filter to lessen background noise from the one or more signals.

35. The system of claim 19, wherein each of the plurality of communication nodes are further configured to:
   i) monitor the communication network for an event;
   ii) modify one or more of the plurality of communication nodes to the directional mode if an event is detected;
   iii) continue communicating with the two or more of the plurality of communication nodes if an event is not detected; and
   iv) repeat steps i) to iii) until the hydrocarbon operations are complete.

36. The system of claim 19, wherein the plurality of communication nodes and the one or more drilling strings are disposed within the wellbore.

37. The system of claim 19, wherein the plurality of communication nodes and the one or more tubular members are disposed along the drilling string.

* * * * *